United States Patent [19]
Lubin et al.

[11] Patent Number: 5,974,159
[45] Date of Patent: Oct. 26, 1999

[54] METHOD AND APPARATUS FOR ASSESSING THE VISIBILITY OF DIFFERENCES BETWEEN TWO IMAGE SEQUENCES

[75] Inventors: Jeffrey Lubin, South Orange, N.J.; Michael Henry Brill, Morrisville, Pa.; Aalbert De Vries, Lawrenceville; Olga Finard, Princeton, both of N.J.

[73] Assignee: Sarnoff Corporation, Princeton, N.J.

[21] Appl. No.: 08/829,516

[22] Filed: Mar. 28, 1997

Related U.S. Application Data

[60] Provisional application No. 60/014,332, Mar. 29, 1996, provisional application No. 60/014,688, Apr. 2, 1996, and provisional application No. 60/014,333, Mar. 29, 1996.

[51] Int. Cl.$^6$ .................................. G06T 5/10; G06T 7/00
[52] U.S. Cl. ..................... 382/106; 382/154; 382/162; 382/255; 382/274; 382/279; 382/302
[58] Field of Search ................................. 382/260, 264, 382/263, 270, 254, 303, 302, 304, 106, 154, 162, 255, 274, 279; 348/42

[56] References Cited

U.S. PATENT DOCUMENTS

| | | |
|---|---|---|
| 4,792,854 | 12/1988 | Glenn . |
| 5,204,944 | 4/1993 | Wolberg et al. ............... 382/276 |
| 5,394,483 | 2/1995 | Daly . |
| 5,517,581 | 5/1996 | Johnston et al. ............... 382/232 |
| 5,694,491 | 12/1997 | Brill et al. ..................... 382/260 |

OTHER PUBLICATIONS

Copy of International Search Report dated Aug. 27, 1997, from corresponding international application.

*Primary Examiner*—Scott Rogers
*Attorney, Agent, or Firm*—William J. Burke

[57] ABSTRACT

A method and apparatus for assessing the visibility of differences between two input image sequences. The apparatus comprises a visual discrimination measure having a retinal sampling section, a plurality of temporal filters and a spatial discrimination section. The retinal sampling section applies a plurality of transformations to the input image sequences for simulating the image-processing properties of human vision. The temporal filters separate the sequences of retinal images into two temporal channels producing a lowpass temporal response and a bandpass temporal response. The spatial discrimination section applies spatial processing to the temporal responses to produce an image metric which is used to assess the visibility of differences between the two input image sequences.

20 Claims, 9 Drawing Sheets

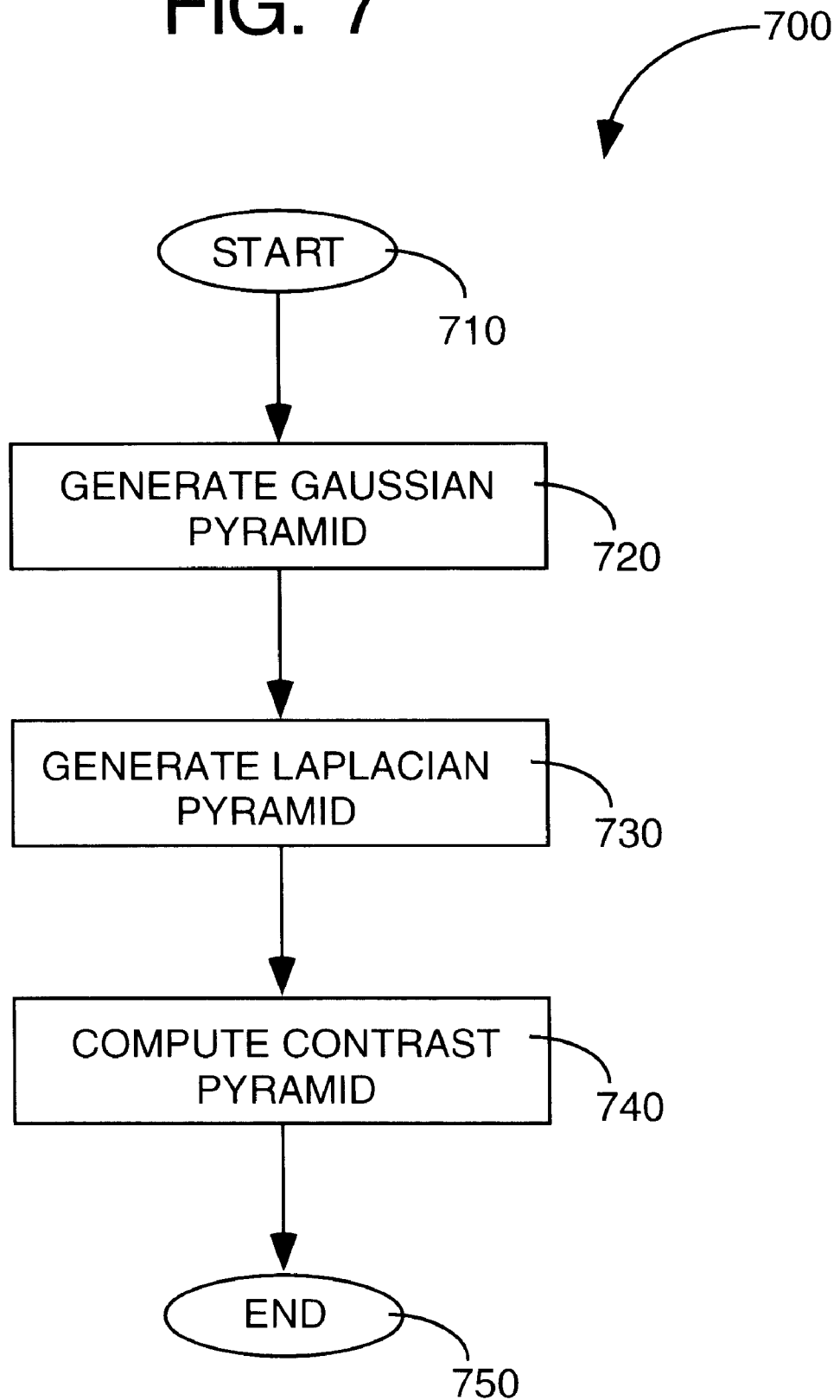

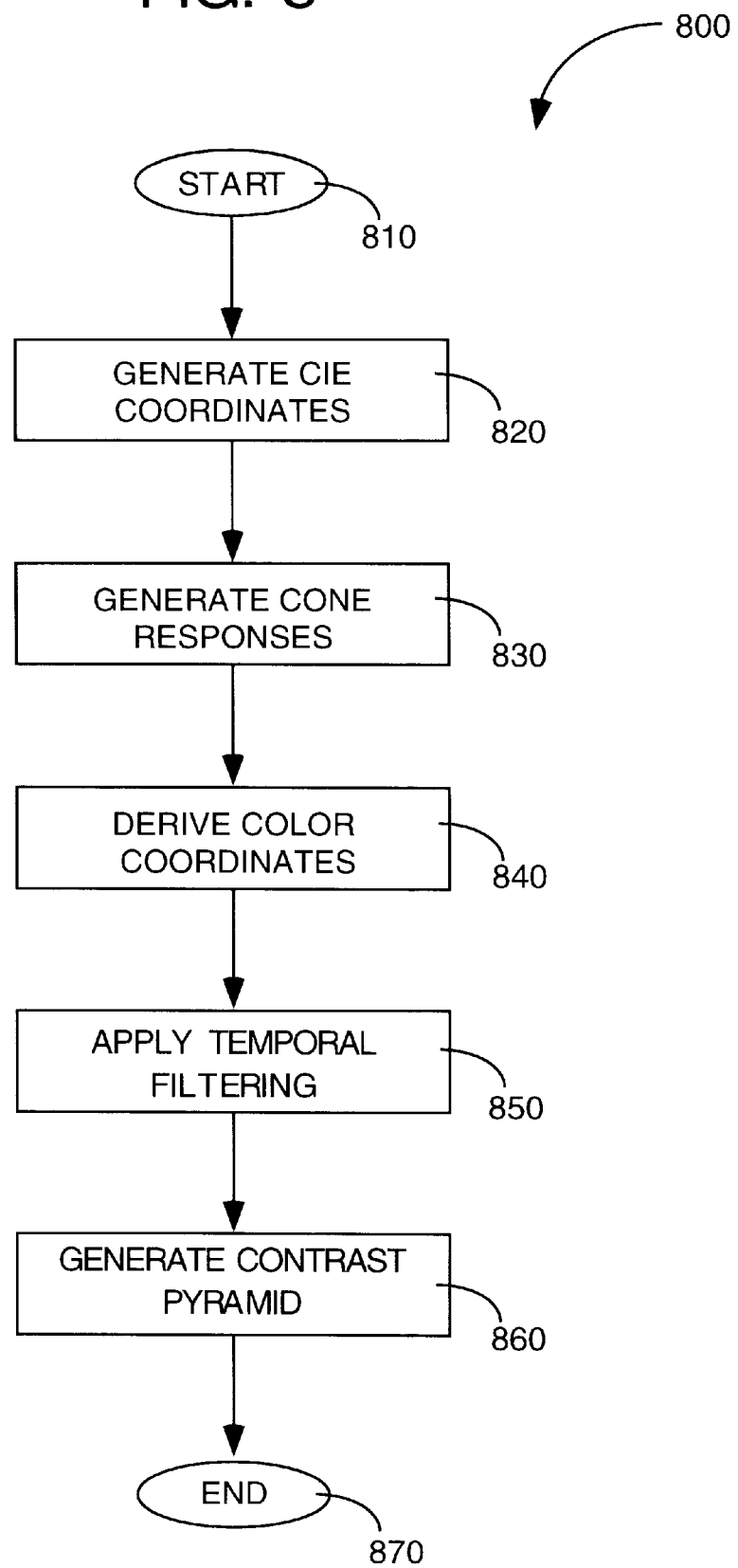

METHOD AND APPARATUS FOR ASSESSING THE VISIBILITY OF DIFFERENCES BETWEEN TWO IMAGE SEQUENCES

This application claims the benefit of U.S. Provisional Applications No. 60/014,332 filed Mar. 29, 1996, No. 60/014,688 filed Apr. 2, 1996, and No. 60/014,333 filed Mar. 29, 1996.

The present invention relates to an apparatus and concomitant method for evaluating and improving the performance of imaging systems. More particularly, this invention relates to a method and apparatus that assesses the visibility of differences between two image sequences.

BACKGROUND OF THE INVENTION

Designers of imaging systems often assess the performance of their designs in terms of physical parameters such as contrast, resolution and bit-rate efficiency in compression/decompression (codec) processes. While these parameters can be easily measured, they may not be accurate gauges for evaluating performance. The reason is that end users of imaging systems are generally more concerned with the subjective visual performance such as the visibility of artifacts or distortions and in some cases, the enhancement of these image features which may reveal information such as the existence of a tumor in an image, e.g., a MRI (Magnetic Resonance Imaging) image or a CAT (Computer-Assisted Tomography) scan image.

For example, an input image can be processed using two different codec algorithms to produce two different codec images. If the measure of codec image fidelity is based purely on parameters such as performing mean squared error (MSE) calculations on both codec images without considering the psychophysical properties of human vision, the codec image with a lower MSE value may actually contain more noticeable distortions than that of a codec image with a higher MSE value.

Over the years, various human visual performance models have been used to improve imaging system design. One model (known as the Carlson and Cohen model) decomposes an input image by partitioning its one-dimensional power spectrum into a number of discrete adjacent frequency bands. The integral of the amplitude values within each band is then subjected to a static non-linearity that is accelerating for small input values and compressive for large values. Changes in the output of this process from one member of a pair of images to the other provide a simple perceptual measure of the visibility of differences between the two images.

A similar method is the square root integral model (SQRI). In this model, the separate frequency-selective bands are replaced by a single integral over spatial frequencies, based on the ratio between the modulation transfer function of the display and an arithmetic approximation to the contrast sensitivity function of the human observer. Although the SQRI has been successfully applied to a number of different display evaluation problems, this model and other basic psychophysics models are spatially one-dimensional. Namely, these models predict sensitivity to spatial variation in one dimension only.

Therefore, a need exists in the art for a method and apparatus for assessing the effects of physical parameters on the subjective visual performance of an imaging system. Specifically, a need exists for a method and apparatus for assessing the visibility of differences between two sequences of time-varying visual images.

SUMMARY OF THE INVENTION

The present invention is a method and apparatus for assessing the visibility of differences between two input image sequences. The apparatus comprises a visual discrimination measure having a retinal sampling section, a plurality of temporal filters and a spatial discrimination section.

The retinal sampling section applies a plurality of transformations to the input image sequences for simulating the image-processing properties of human vision. The retinal sampling section converts the input images to retinal images. Furthermore, if chrominance components are present in the input images, additional transformations are applied to the input image sequences for assessing the visibility of differences in the chrominance components.

The temporal filters then separate each of the sequences of retinal images into two temporal channels producing a lowpass temporal response and a bandpass temporal response, thereby producing a total of four temporal responses (if chrominance components are addressed in the input image sequence). Next, the spatial discrimination section applies spatial processing to the images to produce an image metric which reveals the visibility of differences between the two input image sequences.

BRIEF DESCRIPTION OF THE DRAWINGS

The teachings of the present invention can be readily understood by considering the following detailed description in conjunction with the accompanying drawings, in which:

FIG. 7 illustrates a flowchart of a method for generating a contrast pyramid;

FIG. 8 illustrates a flowchart of a method for implementing the color adjunct embodiments of the visual discrimination;

To facilitate understanding, identical reference numerals have been used, where possible, to designate identical elements that are common to the figures.

DETAILED DESCRIPTION

Figure 1:
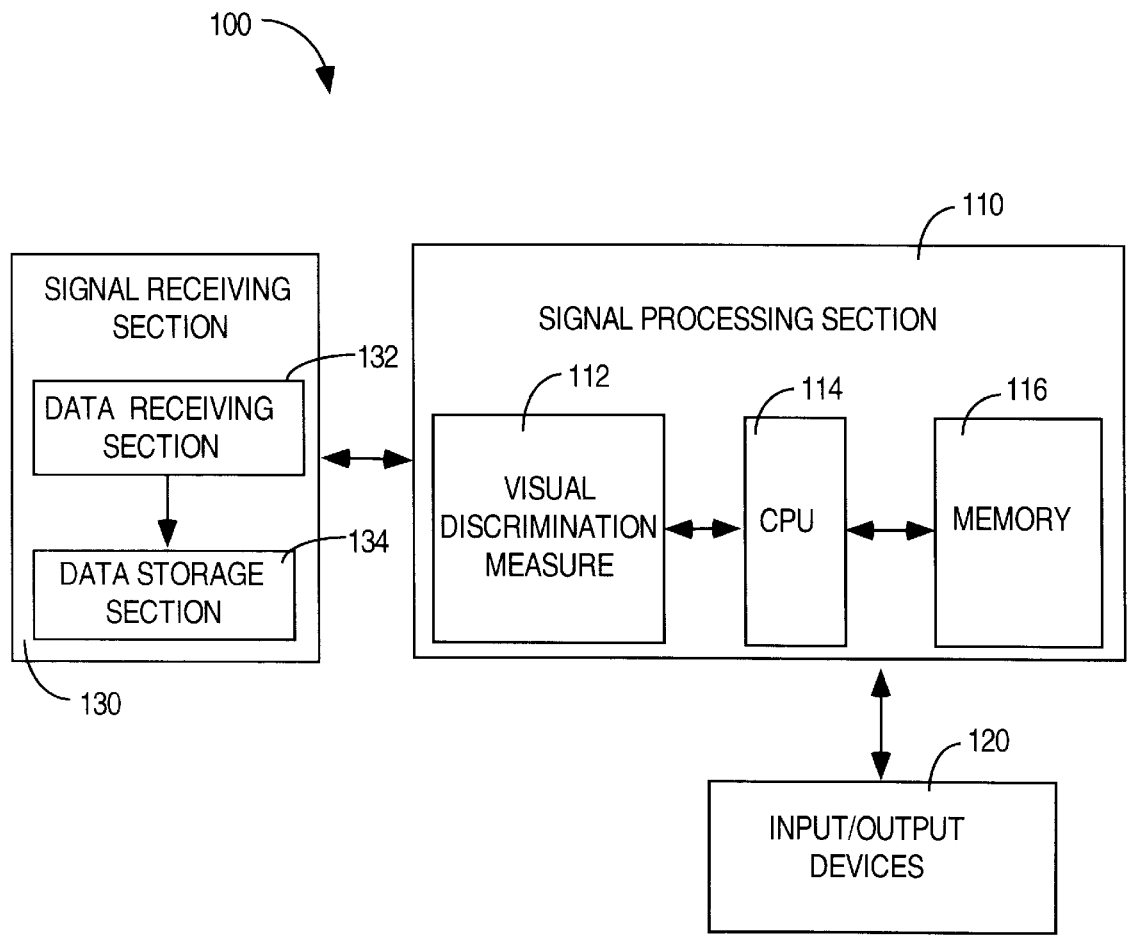
FIG. 1 illustrates a block diagram of a signal processing system of the present invention.

FIG. 1 depicts a signal processing system 100 that utilizes the present invention. The signal processing system consists of a signal receiving section 130, a signal processing section 110 and input/output devices 120.

Signal receiving section 130 serves to receive input data signals, such as sequences of images from imaging devices.

Signal receiving section 130 includes a data receiving section 132 and a data storage section 134. Data receiving section 130 may include a number of devices such as a modem and an analog-to-digital converter. A modem is a well-known device that comprises a modulator and a demodulator for sending and receiving binary data over a telephone line or other communication channel, while an analog-to-digital converter converts analog signals into a digital form. Hence, signal receiving section 130 may receive input signals "on-line" or in "real-time" and, if necessary, convert them to a digital form. As such, section 130 may receive signals from one or more devices such as a computer, a camera, a video recorder or various medical imaging devices.

The data storage section 134 serves to store input signals received by data receiving section 132. Data storage section 134 contains one or more devices such as a disk drive, semiconductor memory or other storage media. These storage devices provide a method for applying a delay to the input signals or to simply store the input signals for subsequent processing.

In the preferred embodiment, the signal processing section 110 comprises a general purpose computer having a visual discrimination measure (VDM) 112, a central processing unit (CPU) 114 and a memory 116 to facilitate image processing. The visual discrimination measure 112 can be a physical apparatus constructed from various filters which is coupled to the CPU through a communication channel. Alternatively, the visual discrimination measure 112 can be implemented as a software application recalled from the memory 116 and executed by the CPU of the signal processing section.

The signal processing section 110 is also coupled to a plurality of input and output devices 120 such as a keyboard, a mouse, a video monitor or storage devices including but not limited to a hard disk drive or a compact disk drive. The input devices serve to provide inputs (control signals and data) to the signal processing section for processing the input images, while the output devices serve to display or record the results.

The visual discrimination measure 112 assesses the visibility of differences between two sequences or streams of input images and generates an objective "just-noticeable difference" (JND) image metric. This metric can be expressed as a JND value, a JND map for each pair of input images or a probability prediction. In turn, the CPU may utilize the JND image metric to optimize various processes including, but not limited to, digital image compression, image quality measurement and target detection.

Figure 2:
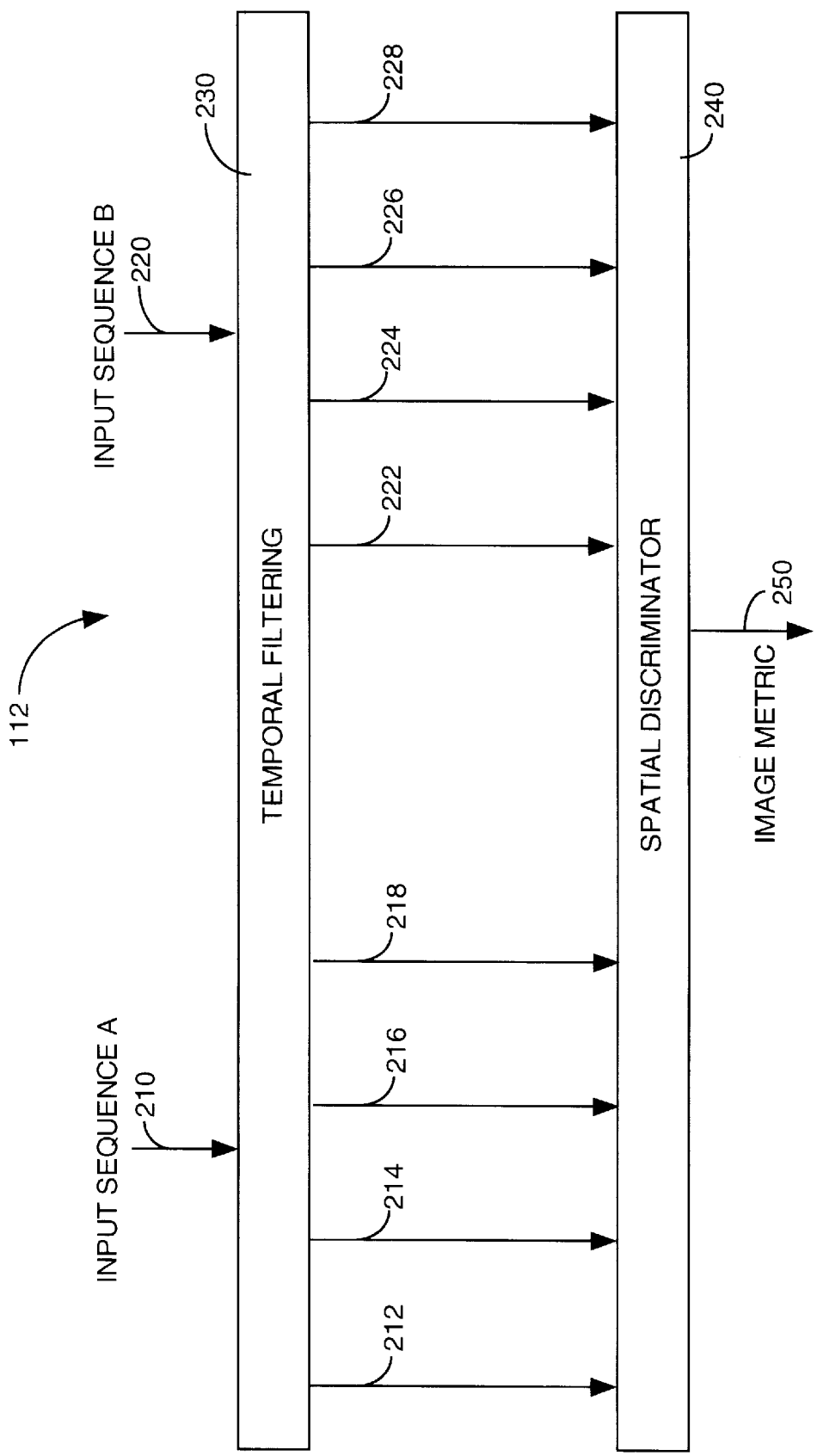
FIG. 2 illustrates a simplified block diagram of the structure of the visual discrimination measure.

FIG. 2 depicts a simplified block diagram of the structure of the visual discrimination measure 112, where two input image sequences 210 and 220 are processed to produce an image metric 250. The visual discrimination measure comprises a temporal filtering section 230 and a spatial discriminator 240.

In the preferred embodiment, the stimuli are two digitized sequences of images, input image sequence A 210 and input image sequence B 220. For example, sequence A may comprise original images (e.g., a reference image sequence) while sequence B may comprise codec processed images of sequence A (e.g., a test image sequence). The input sequences represent time frames of sampled luminance distributions on a planar surface, i.e., as would be returned from a photometer sampling a uniform grid of closely spaced points on the surface of a display device. However, since the present invention is also designed to account for differences in the chrominance between the two input image sequences, the stimuli may include chrominance components as well.

Temporal filtering section 230 applies temporal filtering to both image sequences to produce eight separate responses (channels) 212–218 and 222–228. For example, the luminance component (signal) of the input image sequence 210 are filtered into a low-pass temporal response 212 and a band-pass temporal response 214. Similarly, the chrominance components (signals) of the input image sequence 210 is filtered into a low-pass temporal response 216 and a band-pass temporal response 218. Thus, eight (8) channels are created for two input image sequences. The eight responses are received by the spatial discriminator 240 to produce an image metric 250, which provides a measure of the visibility of differences between the two input image sequences. Furthermore, an optional retinal sampling section (shown in FIG. 3 below) can be incorporated to preprocess the input image sequences prior to temporal filtering, thereby further enhancing the predictive accuracy (relative to human performance) of the visual discrimination measure.

Figure 3:
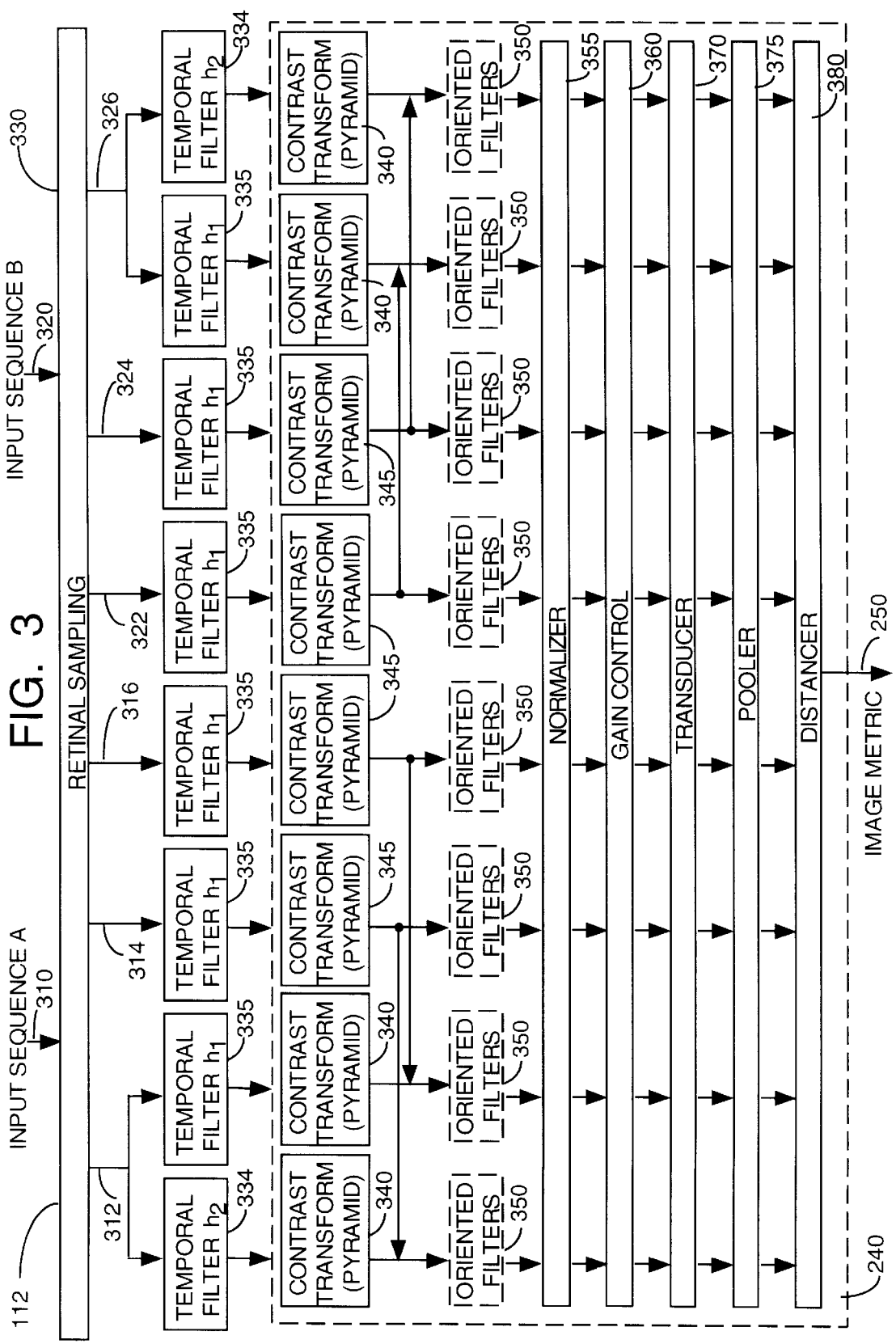
FIG. 3 illustrates a detailed block diagram of the structure of the visual discrimination measure.

FIG. 3 depicts a detailed block diagram of the structure of the visual discrimination measure 112. The visual discrimination measure comprises an optional retinal sampling section 330, a plurality of temporal filters 335 and 334, and a spatial discrimination section 240. The spatial discrimination section (spatial discriminator) comprises a plurality of contrast pyramid filters 340 and 345, a plurality of optional oriented filters 350, a normalizer 355, a gain control section 360, a transducer section 370, a pooling section (pooler) 375 and a distance section (distancer) 380.

The retinal sampling section (retinal sampler) 330 receives and processes a plurality of stimuli to produce retinal sampled image sequences. Namely, the retinal sampling section resamples the stimuli to simulate the sampling process of a human eye. In addition, the retinal sampling section 330 may apply additional processings to prepare the image sequences for the effect of digital image processing. The retinal sampling section 330 is described in detail below with reference to FIG. 4.

Figure 4:
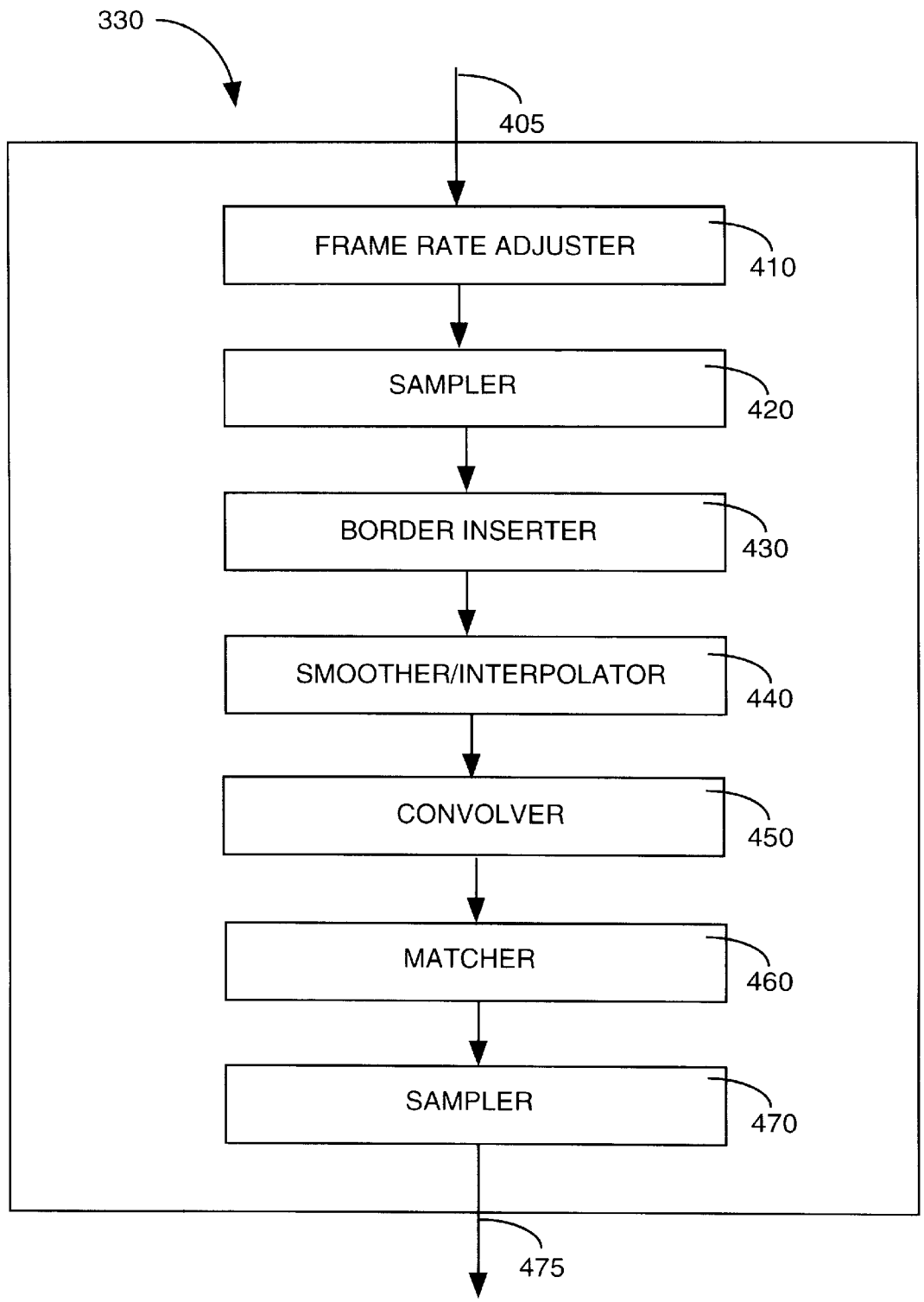
FIG. 4 illustrates a block diagram of the retinal sampling section of the visual discrimination measure.

Referring to FIG. 4, the retinal sampling section 330 comprises a frame rate adjuster 410, a sampler 420, a border inserter 430, a smoother/interpolator 440, a convolver 450, a matcher 460 and a sampler 470. The retinal sampling section 330 serves to approximate the sampling process of a human eye while adapting the images for optimal digital image processing.

The frame rate adjuster 410 receives the image sequence 405 (it may comprise input sequence 210 or 220) and determines whether the frame rate is within the range that can be processed by a human eye. The frame rate adjuster incorporates a time-resampling method to address the possibility that the image sequence contains more frames per second than the vision model of a human eye can realistically process (e.g., 12,000 frames/second).

However, human vision can only resolve images with interframe interval greater than about 0.01 seconds, within which light intensity trades off against duration because the human eye is almost a perfect time-integrator. In cases of high frame rates, the frame rate adjuster 410 accumulates the averages (arithmetic means) of frames over consecutive rectangular time windows to arrive at new, subsampled pixel values. Namely, the frame rate adjuster 410 resamples an image sequence in time by evaluating mean pixel values for each pixel location over a number of frames $N_f$, and thereby computing new frames (frame adjusted image sequence) evaluated at $1/N_t$ of the original frame rate. The number $N_t$ is taken to be the greatest integer in $N_f/100$, where $N_f$ is the number of original frames per second. In the preferred embodiment, resampling does not take place unless the original frame rate is 200 Hz or higher.

Next, the input image sequence is adjusted by the sampler 420 to correlate the relationship between the input "pixel geometry" of the input image sequences and the "receptor geometry" of the retina. Namely, the sampler 420 correlates the inter-pixel spacing, size of the pixels and viewing distance of the input images with the inter-receptor spacing and size of the receptor of the retina respectively. Thus, sampler 420 computes an angular subtend for each pixel as seen from a viewer.

More specifically, sampler 420 assesses the input pixel geometry of an image such as the physical size of the image (w by h), pixel size (m by n), and viewing distance $d_o$. In turn, $\phi_o$, the original angular extent of a pixel (in the display domain, $x_s$), can be calculated as:

$$\phi_o = \left(\frac{2}{n}\right)\tan^{-1}\left(\frac{w}{2d_o}\right) \tag{1}$$

However, each "retinal pixel" (in the domain x) must subtend an angle of $\phi_r=0.0068°$. The selected $\phi_r$ value is close to the foveal inter-receptor spacing (24 to 27 seconds of visual angle, See C. H. Graham, "Vision And Visual Perception", Wiley pg. 330, 1966). Furthermore, the selected $\phi_r$ value of 0.0068 degrees provides convenience in that a pixel size of 0.238 mm on a standard monitor, viewed at a viewing distance of two (2) meters, would subtend one inter-receptor distance. The sampler 420 resamples the input image to make $\phi_o=\phi_r$. If $$\frac{m}{n} \neq \frac{w}{h},$$

then the resampling will be different for the width and height. For example, if $d_o$=46 cm, m=n=512, w=h=8 cm, then $\phi_o$=0.01941. Since $\phi_o>\phi_r$, the image must be upsampled. In this case, the 512×512 grid is upsampled by the factor 0.01941/0.0068, creating a new grid size 1461 by 1461 pixels, or about 10 degrees of visual angle.

Next, the border inserter 430 receives the input image sequence and adds a fixed-width border to the input image to prevent boundary effects (artificial high contrast edges) in later filtering and pyramid processing. Namely, the input image sequence will undergo numerous convolutions where the edge of the image may introduce contamination to the image, e.g., "wrap-around" error. Thus, the border width is set to the width of the resolution cell of the lowest-resolution layer of the contrast pyramid (discussed below). Two types of borders, fixed value border and edge value controlled border, can be specified as illustrated in FIG. 5 and FIG. 6 respectively.

Figures 5, 6, 9:
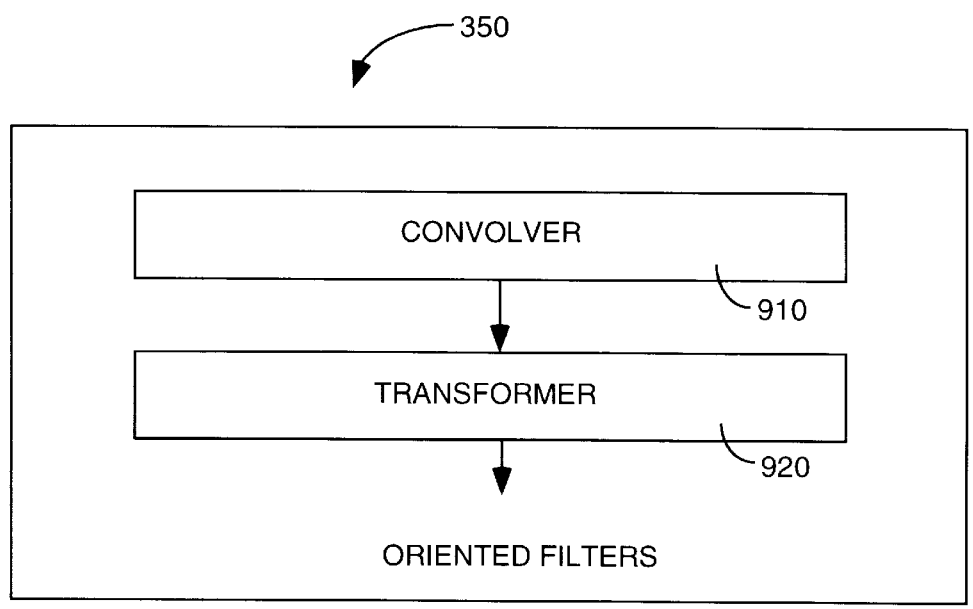
FIG. 5 illustrates an example of a fixed value border.
FIG. 6 illustrates an example of an edge controlled border.
FIG. 9 illustrates a block diagram of the oriented filters of the present invention.

FIG. 5 illustrates a cutout view of a single fixed value border 520 surrounding the edge 510 of an image 530. The fixed value, illustrated by the letter "s", in the border 520 is selected without regard to the values on the edge of the image.

In contrast, FIG. 6 illustrates a cutout view of an edge controlled border 620 surrounding the edge 610 of an image 630. The values in the border 620 are selected to correspond to those values in the edge of the image, thereby extending the edge of the image by a predefined width.

Returning to FIG. 4, the input image sequence is then adjusted by the smoother/interpolator (sampler) 440 to account for the pixels-to-receptors ratio (including fractional pixels and receptors). Namely, the smoother/interpolator 440 addresses the situations where the number of pixels is greater than the number of receptors and vice versa.

More specifically, the smoother/interpolator 440 interpolates or smoothes each input image (of sampling interval $\phi_o$), separately in the horizontal and vertical directions, with a function h, and resamples the input image at intervals $0.5\phi_r$ (half the photoreceptor sampling interval) to produce a "smoothed/interpolated image sequence". In one dimension, h is a Hamming-windowed sinc function (weighting function), with the continuous representation $$h(z)=[0.53+0.47 \cos(\pi z/4)] \sin(\pi z)/(\pi z) \tag{2}$$

for z between −4 and 4 with h(z)=0 outside this interval.

The weighting function h is applied differently depending on whether $0.5\phi_r$ is greater than or less than $\phi_o$. If $0.5\phi_r$ is greater than $\phi_o$, then h is predominantly a smoothing filter (down-sampling) applied to the input image, thereby ensuring that all the input pixels contribute to the output pixels.

In contrast, if $0.5\phi_r$ is less than $\phi_o$, then h behaves predominantly as an interpolator (up-sampling) on the sparse input pixel values. Accordingly, the relationship of the h-domain z to the visual angle (in degrees) is made to depend on a quantity R expressed as:

$$R=0.5\phi_r/\phi_o \tag{3}$$

where the width of h is set to $(8^*\max(0.5\phi_r, \phi_o))$. Since R is not necessarily an integer, there are also fractional pixel offsets. The pixel offsets also affect z in a non-stationary manner, such that the resampling algorithm is not a simple convolution. These constraints lead to two specific implementations.

First, if R is less than 1, then for each pixel i in the input image, the weighting function h centered on i determines the contributions of pixel i to a series of new pixels. If j(i) is defined as the index of the nearest new pixel to i, then i/R=j−D, where D is between −0.5 and 0.5. Since the width of the window function h in this case is $8\phi_o$, z is expressed as:

$$z=(k+D)R \tag{4}$$

where k is a new pixel position measured from j. Hence, the contribution of the old pixel i to a new pixel at j+k is h((k+D)R) times the old pixel value at i.

In contrast, if R is greater than 1, then for each new pixel j, the weighting function h computes the contributions to j due to all old pixels i. The center of h is at i(j), the index of the nearest old pixel to j. Hence jR=i−D, where D is between −0.5 and 0.5. Since the width of window function h in this case is $4\phi_r$, z is expressed as:

$$z=(k-D)/R \tag{5}$$

where k is an old pixel index measured from i. Hence, the contribution of the old pixel i−k to a new pixel at j is h((k−D)/R) times the old pixel value at i−k.

However, prior to the performance of the smoothing/interpolating function, the weighting function h is divided by the sum of over the width of h samples (output samples when R<1, and input samples when R>1). This measure ensures that the energy is conserved in the smoothing/interpolating process.

Once the smoother/interpolator 440 has processed the images, the input images are then convolved by the convolver 450 with a function approximating the point spread produced by the optics of the eye, thereby producing a convolved input image sequence. This function is expressed as:

$$Q(\rho)=0.952\exp(-2.59|\rho|^{1.36})+0.048\exp(-2.43|\rho|^{1.74}) \qquad (6)$$

where $\rho$ is distance in minutes of arc (expressed in visual angle) from a point of light (measured in the plane of the image, whose normal is assumed to be the principal ray of the eye's optics), and $Q(\rho)$ is the intensity of light at a distance $\rho$, relative to the maximum. This function is disclosed by G. Westheimer in "The Eye As An Optical Instrument" in *Handbook of Perception and Human Performance* (1986).

Alternatively, equation (6) can be represented approximately as a product of two point-spread functions where $\rho$ is replaced by the retinal coordinate x in one factor, while $\rho$ is replaced by the retinal coordinate y in the other factor (expressed in minutes of arc). Thus, the point-spread function is approximated by the product $Q(x)Q(y)$, where $Q(\ )$ is the function represented in equation (6). In the preferred embodiment, the optical spread function is implemented by first convolving the input image with a two-sample-long boxcar function before being convolved with a row (or column) of the image. Next, the result is downsampled by a factor of 2 to yield the final convolved input image with pixel spacing $\phi_r$.

Next, the retinal sampling section 330 may comprises an optional matcher 460 for performing an optional operation on the input images if the fixation depth does not match the image depth. Image depth is the actual distance from the focal center of the eye to the image. Fixation depth is the distance at which the observer is fixating his/her eyes. In order to account for changes in effective image resolution with changes in the difference between image depth and fixation depth, geometrical optics are used to calculate the size of a blur circle. The application of the blur circle to the convolved input image sequence produces a matched input image sequence.

If the fixation depth is $D_F$, viewing distance to the screen is D, the depth of the retina from the pupil is $D_i$ and pupil diameter is d, then the blur circle radius r is given by d/2 times the absolute value of $(D_i-D_i')$ divided by $D_i$. The parameter $D_i'$ is the distance of the retina from the pupil that would render the screen completely in focus, where $D_i'$ is given by the thin-lens formula $(1/D_i'=1/D_i+1/D_F-1/D)$. This calculation requires knowledge of the distance $D_i$ from the pupil to the imaging surface (i.e., the retina), taken as 20.3 mm from Westheimer (1986). However, in the preferred embodiment, it is assumed that image depth equals fixation depth to simplify computational overhead.

Finally, the retinal sampling section 330 may comprise an optional sampler 470 to account for the effect of foveal viewing versus non-foveal viewing. The area of densest photoreceptor sampling on the retina is the fovea, covering approximately the central two (2) degrees around the point of fixation. In this region, the linear photoreceptor density is approximately 120 retinal cones per degree. However, beyond the foveal region, the linear density of photoreceptors declines as a roughly linear function of eccentricity.

Thus, the input image is sampled differently by the retina depending whether the image is viewed foveally. To simulate this sampling process of the human eye, the sampler 470 may sample the input image at a density of 120 pixels per degree of visual angle to generate a "retinal image" 475 of 512×512 pixels for "foveal viewing". Similarly, the sampling density for "non-foveal viewing" is calculated from the expression:

$$d = \frac{120}{1+ke} \qquad (7)$$

where d is the calculated density, e is the eccentricity in degrees, and k is a parameter set at 0.4, where the value is estimated from psychophysical data disclosed by A. Watson in "Detection And Recognition Of Simple Spatial Forms", in *Physical and Biological Processing of Images* (1983). However, foveal viewing is assumed in the preferred embodiment.

To reduce the computational overhead, the matcher 460 and sampler 470 are not implemented in the preferred embodiment. Those skilled in the art will realize that the various components within the retinal sampling section 330 can be optionally implemented or replaced with similar processing to address the requirements of different applications. Thus, the input sequences 210 and 220 of FIG. 2 may simply represent the original unprocessed input images or they may represent the retinal images 475 having undergone through one or more of the various image processing steps of retinal sampling section 330.

Returning to FIG. 3, the visual discrimination measure 112 incorporates a plurality of temporal filters 334 and 335 to separate the luminance component of each input sequence of images into two different channels. Similarly, the chrominance components of each input sequence of images are also separated into two different channels via a second set of temporal filters 334 and 335. Thus, each of the two input sequence undergoes temporal filtering to generate four responses as inputs to the spatial discriminator 240 as illustrated in FIG. 2.

Two temporal filters, labeled $h_1$ 335 and $h_2$ 334 in FIG. 3, are used to separate each input sequence into a lowpass (sustained channel) temporal response and a bandpass (transient channel) temporal response to produce a total of four responses. Other temporal filters with different analytic forms can be employed with the condition that the basic lowpass and bandpass shapes are maintained.

Effectively, the sustained channel blurs the input stream (image sequence) temporally, but provides relatively good spatial resolution. Thus, the output of this channel is ideal for looking at fine details and color metric. Conversely, the transient channel blurs the input stream spatially, but provides good temporal resolution which is ideal to detect motion or color changes in the input image sequences.

More specifically, the two temporal filters apply temporal filtering to each input image sequence, which is represented by I(x,t) to produce two filtered sequences $J_n(x,t)$ expressed as:

$$J_n(x,t)=I(x,t)*h_n(t), \qquad (8)$$

where n=1 or 2, and "*" denotes temporal convolution. In the preferred embodiment, the lowpass temporal filter (sustained impulse-response function) and bandpass temporal filter (transient impulse-response function) can be expressed respectively as:

$$h_1(t)=a\exp(-at)u(t) \qquad (9)$$

$$h_2(t)=b[(bt)^3/3!-(bt)^5/5!]\exp(-bt)u(t) \quad (10)$$

where u(t) is the unit step function [u(t)=0 for t<0, else u(t)=1], "b" is a positive real, which defaults to 84.14 Hz, and "a" defaults to 5.2 Hz. Calibration using the contrast-sensitivity data of Koenderink and van Doorn, "Spatiotemporal Contrast Detection Threshold Surface Is Bimodal", *Optics Letters* 4, 32–34 (1979) yield a set of values for a and b that are discussed below with reference to Tables 1–3.

One implementation of the temporal filters involves computing the quantities $$J_n(x, t) = \int_0^\infty I(x, t-t')h_n(t')dt', \quad (11)$$

which can be approximated by the summations $J'_n(x, j)$ with time index j, spatial coordinates x and time step $\Delta t$. In the preferred embodiment, the quantity $\Delta t$ is chosen as 1/30 sec. (the video frame rate) or 1/60 sec. (the video interlace-field rate).

For the sustained impulse-response function (n=1), with its expected approximate 0.5 second duration, the summation is adequately represented by a straightforward (delta-function) sampling:

$$J'_1(x, j) = \sum_{k=0}^\infty I(x, [j-k]\Delta t)h_1([k+0.5]\Delta t)\Delta t. \quad (12)$$

where k represents a dummy index. The term $0.5\Delta t$ in the argument of $h_1$ justifies the Riemann sum at the middle of each interval, and hence removes the artifact due to the leading edge of the negative-exponential $h_1(t)$.

However, the expected duration of the transient response (n=2) is of such short duration that the delta function of equation (12) may perform poorly and leads to undersampling. For the transient response, the temporal filter models the time waveform g(t) of the frame as it turns on and off. Then the image sequence I(x,t) is represented as:

$$I(x, t) = \sum_{k=-\infty}^\infty I_D(x, k\Delta t)g(t-k\Delta t), \quad (13)$$

where $I_D(x, k\Delta t)$ are the digital pixel values, and the spatial coordinates x are carried along.

Furthermore, since this representation of equation (13) does not lose generality, it can be applied to the sustained channel (n=1). Thus, equation (11) is expressed as:

$$J_n(x, t) = \sum_{k=-\infty}^\infty I_D(x, k\Delta t)\int_0^\infty g(t-k\Delta t-t')h_n(t')dt' \quad (14)$$

The above function of time of equation (14) can be sampled at any rate (including the frame rate) without a loss of accuracy. To illustrate, if $J_n$ is time-sampled at a rate $\Delta t_1$, so that $t=j\Delta t_1$. Then $J'_n(x,j)$ is expressed as:

$$J'_n(x, j) = \sum_{k=-\infty}^\infty I_D(x, k\Delta t)H^{(n)}(j\Delta t_1 - k\Delta t), \quad (15)$$

where $$H^{(n)}(\tau) = \int_0^\infty g(\tau - t')h_n(t')dt'. \quad (16)$$

where $\tau = j\Delta t_1 - k\Delta t$.

The integrals represented by $H_m$ is evaluated analytically or numerically at a finer temporal resolution than $\Delta t$. Thus, in the preferred embodiment appropriate to a liquid crystal display, the function g is taken to be a simple rectangle function: g(t)=1 for $0<t<\Delta t$, else g(t)=0. This substitution leads to the following analytic expression for $H_m$:

$$H^{(n)}(\tau)=F^{(n)}(\max[0,\tau])-F^{(n)}(\max[0,\tau-\Delta t]), \quad (17)$$

where $$F^{(1)}(\tau')=-\exp(-a\tau'), \quad (18)$$

$$F^{(2)}(\tau')=[(b\tau')^4/4!+(b\tau')^5/5!]\exp(-b\tau'). \quad (19)$$

For a CRT (and also for the calibration procedure as described below pertaining to CRT data), g(t) is approximately an impulse function, so:

$$H^{(1)}(\tau)=a \exp(-a\tau)u(\tau), \quad (19a)$$

$$H^{(2)}(\tau)=b[(b\tau)^3/3!-(b\tau)^5/5!]\exp(-b\tau)u(\tau). \quad (19b)$$

Finally, the infinite limits of equation (15) are replaced by finite limits imposed by the effective support of $H^{(n)}(\tau)$. A conservative estimate of this support is the following: $H^{(1)}(\tau)$ is nonzero for $\tau$ between 0 and $(1/a)\ln(1000)=N(1)\Delta t$; $H^{(2)}(\tau)$ is nonzero for $\tau$ between 0 and $15/b=N(2)\Delta t$. Given these definitions for N(1) and N(2), and given that $\tau=j\Delta t_1-k\Delta t$ (from equations 15–16), then k in equation (15) is constrained by:

$$j\Delta t_1/\Delta t - N(n) < k < j\Delta t_1/\Delta t. \quad (20)$$

From this constraint, equation (15) can be replaced by the following finite-sum approximation:

$$J'_n(x, j) = \sum_{k=cj-N(n)}^{cj} I_D(x, k\Delta t) H^{(n)}(j\Delta t_1 - k\Delta t), \quad (21)$$

where $c=\Delta t_1/\Delta t$, $N(1)=(a\Delta t)^{-1}\ln(1000)$ and $N(2)=15(b\Delta t)^{-1}$. The lower and upper limits on the sum are respectively lowered and/or raised to the nearest integer.

In summary, one implementation of the temporal filters involves applying Eqs. (17), (18), (19) and (21), which encompass both the sustained and transient temporal channels (n=1,2). In order that all the required values of $I_D(x, k\Delta t)$ be defined in Eq. (21), the image sequence $I_D$ must extend max[N(1), N(2)] frames before the nominal starting point j=0.

Referring to FIG. 3, after the temporal filtering, each of the resulting raw luminance and chrominance signals from the temporal filters is received and converted by contrast transforms 340 and 345 to units of local contrast respectively. Namely, a "contrast pyramid" is generated by decomposing the retinal image into Gaussian and Laplacian pyramids. First, each image is decomposed into a Laplacian pyramid as disclosed by P. J. Burt and E. H. Adelson in "The Laplacian Pyramid As A Compact Image Code", *IEEE Transactions on Communications* (1983).

In the preferred embodiment, the luminance component of the input image is decomposed into a set of seven (7) frequency channels or bandpass (pyramid) levels with peak frequencies ranging from 32 through 0.5 cycles/degree. Each level is separated from its neighbors by one octave, i.e., 32, 16, 8, 4, 2, 1 and 0.5. Then, at each point in each level, the Laplacian value is divided by the corresponding point upsampled from the Gaussian pyramid level two levels down in resolution. Namely, to compute the local contrast at each level of the pyramid, a Laplacian (bandpass) pyramid is generated by subtracting from each Gaussian level a one-level-blurred copy of itself; the result is divided by a two-level-blurred copy.

Mathematically, one implementation of the contrast pyramid operation can be expressed (in the continuous domain) as:

$$E_{kn}(x,t)=[J_n(x,t)*\{G_k(x)-G_{k+1}(x)\}]/[J_1(x,t)*G_{k+2}(x)], \quad (22)$$

where $E_{kn}(x,t)$ is the contrast at pyramid level k and index n=1 or 2 (sustained or transient), x is a two-dimensional position vector, $J_n(x,t)$ is the input image from the temporal filter, "*" denotes 2D spatial convolution and where $G_k(x)$ is a Gaussian convolution kernel expressed as:

$$G_k(x)=(2\pi\sigma_k^2)^{-1} \exp(-x^2/2\ \sigma_k^2) \quad (23)$$

where $$\sigma_k=2^{k-1}\ \sigma_1 \quad (24)$$

and $\sigma_i=0.0068$ is approximately the visual-angle spacing (in degrees) between foveal photoreceptors. The exact numerical value of $\sigma_1$ is chosen to render a pixel spacing of d=0.238 mm just resolvable from a viewing distance D of 2000 mm, in which case $\sigma_1=(d/D)(180/\pi)$ degrees of visual angle. A detailed description on the implementation of equations (22)–(24) to generate the contrast pyramid is discussed below.

Furthermore, to account for the experimental fact (see Van Nes, et al., "Spatiotemporal Modulation Transfer In The Human Eye", J. Opt. Soc. Am. 57, 1082–1088 (1967)) that spatially uniform flicker is visually detectable by the human eye, the general form of equation (22) is changed in the case where n=2 and k=7 (i.e., the lowest resolution for the transient response):

$$E_{72}(x,t)=[J_2(x,t)*G_7(x)]/[J_1(x,t)*G_9(x)] \quad (25)$$

This spatially non-opponent form is reminiscent of the "Type II" neural receptive fields found by Wiesel and Hubel, "Spatial And Chromatic Interactions In The Lateral Geniculate Body Of The Rhesus Monkey", J. Neurophysiol. 29, 1115–1156 (1966).

FIG. 7 illustrates a method 700 for constructing a contrast pyramid as described in equations (22–24) above. Method 700 begins at step 710 and proceeds to step 720 where a Gaussian pyramid is constructed. The Gaussian pyramid is a representation of the functions $G_k(x)$, (k=1, 2, 3 . . . ) in equation (22). The original input image is called the first level of the pyramid, $G_1$. Subsequent levels, at lower resolutions, are obtained by an operation called "Reduce".

The Reduce operation applies a five-tap low-pass filter with weights (1, 4, 6, 4, 1)/16 to the original input image, $G_1$, sequentially in each direction of the image to generate a blurred image. The resulting blurred image is then sub-sampled by a factor of 2 to create the next level, $G_2$. Method 700 applies the Reduce operation recursively to each new level, and stops when the top level is reached, whose default value is 7.

Referring to FIG. 7, method 700 generates a Laplacian pyramid in step 730. The Laplacian pyramid is a representation of the functions $G_k(x)-G_{k+1}(x)$, (k=1, 2, 3 . . . ) in Eq. (22), and is generated from the Gaussian pyramid of step 720. The k'th level of the Laplacian pyramid, $L_k$, is computed from $L_k=G_k-G_{k+1}$. The point-by-point subtraction of adjacent Gaussian pyramid levels requires prior up-sampling of the $G_{k+1}$ level to match the resolution of the $G_k$ level through an operation called "Expand".

The Expand operation up-samples the image of $G_k$ at Gaussian-pyramid level k by a factor of 2 (i.e., the original samples are spaced out with zeros in between them), and the resulting larger image is convolved with the weights (1, 4, 6, 4, 1)/16 in both x and y directions. In computing the k'th level $L_k$ of the Laplacian pyramid, the Expand operation is alternated with point-by-point subtraction, i.e., $L_k=G_k-$Expand$(G_{k+1})$. This process is continued from the coarsest Gaussian level (k=7) to the finest level (k=1).

In step 740, method 700 computes a contrast pyramid. For a given frame t and temporal channel n, the local contrast pyramid $E_{kn}$ (x,t) defined by equation (22) is computed by dividing each pixel value at each level of the Laplacian pyramid by the corresponding Gaussian value from two (2) levels up interpolated (by the Expand operation) to the current Laplacian pyramid level size. Divide-by-zero errors are avoided by adding a small constant to the divisor (e.g., 1e–10). A correction factor (discussed below) multiplies each level of the contrast pyramid to insure that the calculated contrast equals that computed from a sine wave grating at the peak of each band (0.5, 1, 2, 4, 8, 16, and 32 cpd). Once the contrast pyramid is constructed, method 700 ends in step 750.

In summary, the result of the contrast pyramid operation is a local difference divided by a local mean, i.e., a local measure of contrast, localized in both space and frequency. Namely, the result is a measure of the magnitude of local change divided by the local mean for a number of different scales separated from each other by one octave. For a sine grating within the frequency passband of one pyramid level, the resulting contrast measure is approximately equivalent to the Weber contrast, i.e., $(L_{max}-L_{min})/L_{mean}$, where $L_{max}$, $L_{min}$, and $L_{mean}$ refer respectively to the maximum, minimum, and mean luminance of the grating pattern. This contrast pyramid operation is applied identically to values coming from both temporal filtering channels. A similar process for implementing the contrast pyramid calculation is disclosed by E. Peli in "Contrast In Complex Images", *J. Opt. Soc. Am.* (1990). Furthermore, although the preferred embodiment incorporates a contrast pyramid having seven levels, the present invention can be modified by using contrast pyramids with any number of levels and/or other peak frequency ranges.

The visual discrimination measure 112 records a difference between two input image sequences that differ in their luminance at a given pixel and frame. However, in the preferred embodiment, the differences in the chrominance components between the two input image sequences are also recorded to enhance the detection capability of the visual discrimination measure 112.

In some instances, the detection of differences in chrominance by the visual discrimination measure will not vary substantially from that of the human visual system in assessing the quality of a distorted video sequence relative to an undistorted one. However, various image artifacts are more noticeable with a chrominance component than without one. These artifacts may not be easily detectable by analyzing the luminance component alone by the visual discrimination measure 112. An example of such an artifact is the degradation of a vector-quantized colored image of a large achromatic region that varies smoothly from a light gray on one side to a dark gray on the other side. The uniform patches of pastel color replace the slow achromatic gradient. These patches are far more salient in color than in black-and-white. Thus, the detection capability of the visual discrimination measure is enhanced by incorporating a "color difference detection component" (color adjunct) for various applications, e.g., in rating vector-quantization algorithms.

Two color adjunct embodiments are disclosed below with reference to FIG. 8. The two implementations share a similar architecture, but are implemented in different manners to address different requirements. One embodiment is implemented without having to recalibrate the "luminance portion" of the visual discrimination measure 112. In contrast, the second embodiment provides greater accuracy, but requires recalibration of the "luminance portion" of the visual discrimination measure.

FIG. 8 illustrates a method 800 for implementing the color adjunct of the visual discrimination measure 112. Method 800 begins at step 810 and proceeds to step 820, where CIE (Commission Internationale de l'Eclairage) coordinates for each image pixel are generated.

For each pixel of the input image, the monitor RGB (Red, Green, Blue) values are combined with known emission spectra of the phosphors to produce the CIE coordinates (X, Y, Z), where the color-matching functions corresponding to these coordinates are disclosed by the CIE in 1931, except with the 1951 correction made by D. Judd (See G. Wyszecki and W. S. Stiles, *Color Science,* Second Ed., Wiley, 1982).

In summary, the Judd-modified CIE coordinates are computed from the given digital RGB values and phosphor emission spectra $E_i(\lambda; k_o)$, which corresponds to phosphor i, wavelength $\lambda$, and digital value $k_o$ at which the phosphor spectra were measured. Since the phosphors of commercial monitors or displays differ from manufacturer to manufacturer, the values for the phosphor emission spectra are generally obtained from the National Television Systems Committee (NTSC) receiver phosphor standard. The Judd-modified CIE color-matching functions $\bar{x}(\lambda)$, $\bar{y}(\lambda)$, and $\bar{z}(\lambda)$ are defined in Wyszecki and Stiles, *Color Science,* Second Ed., Wiley, (1982), which are defined as a vector-valued function $x(\lambda)$. For phosphor i, the tristimulus coordinates $X_i(k)$, $Y_i(k)$, $Z_i(k)$ corresponding to digital level k are defined as a vector $X_i(k)$, given by:

$$X_i(k)=Y_i(k)\ [\int x(\lambda)E_i(\lambda;k_o)d\lambda]/[\int \bar{y}(\lambda)E_i(\lambda;k_o)d\lambda] \qquad (26)$$

where the values $E_i(\lambda; k_o)$ and $Y_i(k)$ (k=0, 255) are measured for a particular display. Given the digital values $k_i$ corresponding to the RGB of a pixel, the tristimulus vector X=(X, Y, Z) of the pixel is computed as:

$$X=X_1(k_1)+X_2(k_2)+X_3(k_3) \qquad (27)$$

Conversion of RGB values into CIE coordinates is well known in the art. For a detailed discussion, see G. Wyszecki and W. S. Stiles (1982).

In step 830, the CIE coordinates from step 820 are transformed to the cone responses L, M and S (L=long-wavelength-sensitive, M=medium-wavelength-sensitive, S=short-wavelength-sensitive) by the following equations:

$$L=0.15516X+0.54307Y-0.03287Z$$

$$M=-0.15516X+0.45692Y+0.3287Z \qquad (27a)$$

$$S=0.00801Z.$$

This transformation is disclosed in Wyszecki and Stiles, 1982, Table 2(8.2.5), which is derived from V. Smith and J. Pokorny, "Spectral Sensitivity Of The Foveal Cone Photopigments Between 400 And 500 nm", *Vision Research* 15, 171 (1975). The luminance coordinate Y is also passed unperturbed from step 820.

In step 840, the outputs of step 830 are used to arrive at three color coordinates for each image pixel, i.e., the luminance Y, and the luminance-normalized opponent space (after Judd, "Hue, Saturation And Lightness Of Surface Colors With Chromatic Illumination", *J. Opt. Soc. Am.* 30, 2, 1940):

$$yb=(S/Y)-(S/Y)_{D65} \qquad (28)$$

and $$rg=(L/Y)-(L/Y)_{D65} \qquad (29)$$

where, the subscript D65 means that the chromaticity values or coordinates S/Y and L/Y are obtained for the CIE standard illuminant D65 (See G. Wyszecki and W. S. Stiles, 1982, Op. Cit.). The coordinates S/Y and L/Y are taken from the cone-excitation space advanced by D. MacLeod and R. Boynton in "Chromaticity Diagram Showing Cone Excitation By Stimuli Of Equal Luminance", *J. Opt. Soc. Am.* 69, 1183–1185, 1979. The subtractive correction for the illuminant is taken from D. Judd (1940, *J. Opt. Soc. Am.* 30, 2).

With reference to FIG. 3, step 840 (not shown in FIG. 3) is implemented after the retinal sampling section 330, while the steps of 820–830 (not shown in FIG. 3) are generally implemented prior to subjecting the chrominance components to the processing of the retinal sampling section. Thus, the chrominance components of input sequence 310 and 320 entering the retinal sampling section 330 are represented in cone responses (L, M, S). However, those skilled in the art will realize that the functions performed in steps 820–840 can be implemented in the retinal sampling section. Similar to the above discussion, the amount of "retinal" processing as applied to the chrominance components depends on a particular application. Thus, one or more steps of FIG. 4 can be applied to the chrominance components of the input image sequences.

In step 850, the color coordinates of step 840 are passed through temporal filters 335 and 334 as illustrated in FIG. 3. These temporal filters are identical to those applied to the luminance component of the input image and are implemented in accordance with equations (9) and (10). Although two temporal filters are used for the luminance component 312 of the input image, only one temporal filter (with the form of Equation (9)) is used for each of the two chromatic components 314 and 316 of the input image to produce two chromatic temporal responses.

In step 860, method 800 generates a contrast pyramid for each image of the two chromatic temporal responses (channels). Laplacian pyramids are made from the image-planes of Y, yb, and rg in accordance with steps 720 and 730 of method 700. However, the contrast pyramid for each image-plane is calculated by dividing the Laplacian of the channel by a small constant plus the local mean of the absolute value of the channel:

$$C_Y = \Delta Y/(<Y>+Y_o) \tag{30}$$

$$C_{yb} = \Delta yb/(|<yb>|+yb_o) \tag{31}$$

$$C_{rg} = \Delta rg/(|<rg>|+rg_o) \tag{32}$$

where $C_Y$, $C_{yb}$, and $C_{rg}$ are the contrast-pyramid values at a given level, $\Delta$ refers to the Laplacian pyramid at that level, and $<>$ refers to the value of the Gaussian pyramid two levels coarser than the finest level defining the Laplacian. The values $Y_o$, $yb_o$, and $rg_o$ are constants Once the contrast pyramids are generated, method 800 ends in step 870.

In a second color adjunct embodiment, method 800 is modified with respect to steps 840 and 860. In step 840, method 800 computes the color coordinates for each pixel in accordance:

$$yb = S \tag{33}$$

and $$rg = (L - M) \tag{34}$$

In step 860, the contrast pyramids for the two chromatic channels are constructed by dividing the Laplacian pyramid value at each level by the Gaussian value two levels coarser from the luminance channel, rather than by a local mean of the chromatic channel itself.

The first color adjunct embodiment ensures the virtue of "Black-and-White compatibility" (i.e., changing the intensity level will not change the color of the light). In the event of an image at the chromaticity of D65, an image metric is determined purely by the luminance contrasts without contribution from the yb and rg contrasts. Thus, it is not necessary to recalibrate the visual discrimination measure 112 if the first color adjunct embodiment is employed.

Furthermore, the subtraction in step 840 and the constants $yb_o$ and $rg_o$ ensure that the greatest chromatic sensitivity is near the white point of the monitor (D65), in agreement with observation. In addition, the laplacian-pyramid operator $\Delta$ of $C_{yb}$ and $C_{rg}$ in equations 31 and 32 can be optionally replaced with the gaussian-pyramid operator that was used as the basis of the laplacian pyramid. Removing the laplacian from the chromatic channels ensures that the contrast pyramids provide low-pass spatial filtering with cutoff spatial frequencies that depend on pyramid level.

In contrast, since the chromaticity values or color coordinates are not obtained for the CIE standard illuminant D65 in the second color adjunct embodiment, recalibration of the visual discrimination measure 112 is required. This second embodiment provides greater accuracy at the expense of carrying a recalibration overhead.

Returning to FIG. 3, the visual discrimination measure 112 incorporates a plurality of optional oriented filters 350 for applying orientation tuning or filtering to the contrast pyramids from the eight channels.

If orientation tuning or filtering is chosen, then each level of the contrast pyramid is received and convolved with a set of four (4) pairs of spatially oriented filters 350 to produce a spatially oriented output.

More specifically, FIG. 9 illustrates a block diagram of the oriented filters 350 which comprises a convolver 910 and a transformer 920. The convolver 910 comprises a plurality of spatially oriented filter pairs, where each pair of filters consists of a directional second derivative of a Gaussian (in one of the four directions horizontal, vertical and the two diagonals) and its Hilbert transform. These filters contain a log bandwidth at half height of approximately 0.7 octaves, a value within the range of bandwidths inferred psychophysically by A. Watson in "Summation Of Grating Patches Indicates Many Types Of Detectors At One Retina Location", *Vision Res.* 22 (1982). In the preferred embodiment, the orientation bandwidth of these filters (i.e., the range of angles over which filter output is greater than one half the maximum) is approximately 65 degrees. This figure is slightly larger than the 40 degree tuning of monkey simple cells reported by DeValois et al. in "The Orientation And Direction Selectivity Of Cells In Macaque Visual Cortex", *Vision Res.* 22 (1982) 531–544, and the 30 to 60 degree range reported psychophysically by Phillips and Wilson in "Orientation Bandwidths Of Spatial Mechanisms Measured By Masking", *J. Opt. Soc. Am.* [A]1 (1984) 226–232.

Alternatively, spatially oriented filters with smaller bandwidths can be employed, but additional filters will be required to uniformly cover the range of orientations, which leads to a computationally expensive, slower, but more accurate process. Thus, although prediction accuracy on some orientation masking data may be degraded, employing filters having four (4) orientations provides a good balance between performance and cost. However, those skilled in the art will realize that the number of filters in the present invention can be adjusted to tailor to the requirements of a specific application. In the present invention, the spatially oriented filters are implemented by using the steerable filters of W. T. Freeman and E. H. Adelson in "The Design And Use Of Steerable Filters", *IEEE Transactions on Pattern Analysis and Machine Intelligence* 13 (1991) 891–906.

After oriented filtering, the corresponding Hilbert pairs of filter output images are squared and summed by the transformer 920, resulting in a phase-independent energy response:

$$e_{k,n,\theta}(x_t,t) = (o_{k,n,\theta}(x_t,t))^2 + (h_{k,n,\theta}(x_t,t))^2 \tag{35}$$

where $\theta$ indexes over the 4 orientations, n indexes over the two temporal channels, k is pyramid level, and o and h are the oriented operator and its Hilbert transform. This operation attempts to simulate a widely proposed transformation in the mammalian visual cortex from a linear response among simple cells to an energy response among complex cells. The phase independence resulting from this operation provides some useful properties, e.g., it causes the visual discrimination measure 112 to be less sensitive to the exact position of an edge, a property exhibited in human psychophysical performance.

Returning to FIG. 3, the visual discrimination measure 112 incorporates an optional normalizer 355 for applying normalization to the contrast pyramids. Since the complexity of spatial filtering may vary with the speed vs. accuracy requirements of a particular application, the square of each contrast pyramid output pixel is generally normalized by the value $1/T_{kn}$ which is close to the squared grating contrast detection threshold for that temporal channel, pyramid level and local luminance. Denoting the pyramid level by k (k=1, . . . 7 from finest to coarsest resolution), and the temporal channels by n (n=1, 2) sustained and transient channels respectively, then $\Gamma_{k1}$ are given the following default values in Table 1.

TABLE 1

|  | k = 1 | k = 2 | k = 3 | k = 4 | k = 5 | k = 6 | k = 7 |
|---|---|---|---|---|---|---|---|
| $\Gamma_{k1}(200)$ | 12.73 | 3.204 | 363.5 | 396.3 | 222.7 | 4.573 | 5.467 |
| $\Gamma_{k2}(200)$ | 2.021 | 58.27 | 205.8 | 319.7 | 470.2 | 615.8 | 294.9 |

These values effectively cause the transient channel to have a coarse spatial resolution, and vice versa. The values, determined by calibration described below, are generally functions of average retinal illumination B, but default to values corresponding to B=200 trolands. However, those skilled in the art will realize that other $\Gamma_{kn}$ values can be used. In fact, calibration procedures are provided below for deriving other $\Gamma_{kn}$ values to account for different applications or for fitting different calibration data.

Two implementations are considered. If orientation tuning or filtering is chosen as discussed above, then each energy or measure response of equation (35) is received and normalized by $\Gamma_{kn}$. The result is a set of values $\hat{e}_{k,n}(x,t)$ with an additional index $\theta$ for each orientation channel which is expressed as:

$$\hat{e}_{k,n\theta}(x,t) = \Gamma_{kn} e_{k,n,\theta}(x,t). \tag{36}$$

However, if orientation tuning is not chosen, then normalized outputs $\hat{e}_{kn}(x,t)$ are computed as:

$$\hat{e}_{kn}(x,t) = \Gamma_{kn}\{E_{kn}(x,t)/M_t[v_k, L_k]\}^2 \tag{37}$$

where $L_k$, the local-mean luminance, is given by $J_1 * G_{k+2}$, which is essentially a version of the image sequence that is low-pass-filtered in space and time. $M_t[v_k, L_k]$ is defined as a function where each level of the contrast pyramid is divided by the contrast required for a just-noticeable-difference, determined by the spatial frequency (pyramid level k) and by the local-mean luminance through the Gaussian filter $G_{k+2}(x)$. In $M_t$, the spatial frequency $v_k$ is given by the value for which the k'th level of the contrast pyramid will be most sensitive, which is approximately $v_k = 1/(2\pi\sigma_k)$. The quantities $\Gamma_{kn}$ have been fit by data of contrast sensitivity as a function of spatial and temporal frequencies.

Alternatively, $L_k$ is replaced by the average retinal illuminance B (in trolands) over the whole image. Thus, $M_t$ can be absorbed into the coefficients $\Gamma_{kn}$ where $\hat{e}_{kn}(x,t)$ is expressed as:

$$\hat{e}_{kn}(x,t) = \Gamma_{kn}(B) \{E_{kn}(x,t)\}^2. \tag{38}$$

The quantities $\Gamma_{kn}(B)$ are determined in two stages. First, the quantities $\Gamma_{kn}(200)$ are fitted using the data of Koenderink and van Doorn (1979), which are obtained at 200 trolands of retinal illuminance. Then, the data of van Nes, et al. (1967), obtained at several other illuminance levels, are used to fit $\Gamma_{kn}(B)$ for other values of B. The result is a lookup table for $\Gamma_{kn}(B)$. The computation of B from the luminance pattern comprising the image sequence is described below.

Furthermore, the contrast pyramids for the color adjunct embodiments are normalized by contrast sensitivity functions that are fitted by data in a calibration phase of the model. Calibration might include data such as that of D. H. Kelly (1983, *J. Opt. Soc. Am.* 73, 742–750) and K. T. Mullen (1985, *J. Physiol.* 359, 381–400).

Returning to FIG. 3, the visual discrimination measure 112 incorporates an optional gain control 360 to apply cross-frequency and/or cross-orientation masking of visual threshold. Namely, each filter output is divided or normalized by a sum of some other filter outputs to account for the desensitization of the human visual perception under certain spatial and/or temporal frequency.

More specifically, it has been observed that human visual sensitivity to increments at one spatial (or temporal) frequency is elevated by existing signal (or clutter) at the same spatial frequency. Such elevation of threshold is generally known as "masking" (or in this particular case, it is referred to as "within-band masking").

Another property of human perception is that some masking also occurs on one spatiotemporal frequency or orientation by clutter at significantly different frequencies or orientations. This masking effect is generally known as "cross-motion masking" (J. Lubin, unpublished doctoral dissertation, University of Pennsylvania, 1992) or "cross-orientation masking" in the static case (J. Lubin, "The Use Of Psychophysical Data And Models In The Analysis Of Display System Performance", in *Digital Images in Human Vision*, ed. A. B. Watson, MIT Press, 1993, p 177.) Similar concepts have also been disclosed in the literature (e.g., Heeger, 1991, in *Computational Models of Visual Processing*, MIT Press).

The gain control 360 applies cross-frequency and/or cross-orientation masking of visual threshold to the contrast pyramids. Depending on a specific application, the gain control may operate on the normalized contrast pyramids from normalizer 355 or the orientation tuned contrast pyramids from orientation filters 350. The gain-control function can be expressed as:

$$F_c = x_c \Big/ \left(1 + \sum_i w_i x_i\right) \tag{39}$$

where $x_c$ is the input pyramid value, $F_c$ is the output pyramid value, $w_i$ are constant weights (defaulted to 1), and the sum over i ranges over all levels in the spatial pyramid and over all temporal channels (i.e., 28 channels resulting from seven (7) levels of the contrast pyramid and four (4) temporal channels, luminance and chrominance). In the case where $F_c$ operates after the orientation-tuning of filters 350, the sum also ranges over the orientations (i.e., 112 channels resulting from four (4) orientation). However, the sum does not range over the current channel c, i.e., i ranges over the total number of channels minus one.

The value $F_c$ for a spatio-temporal (-orientation) channel c is decreased by inputs to any other channel i, where the degree of reduction increases with $w_i$ and $x_i$. This reduction in the value of $F_c$ results in a concomitant reduction of differences between image sequences in channel c. In this manner, the gain control function of equation (39) embodies the desired spatio-temporal cross-frequency masking. However, if only one channel c receives excitation by the image sequence, then $F_c = x_c$ such that there is no cross-frequency masking unless there are multiple frequencies.

Returning to FIG. 3, the transducer section (transducer) 370 applies a sigmoid non-linearity to each component of the normalized contrast pyramid to produce a transducer output $P_{kn}(x,t)$. Namely, each component of the normalized contrast pyramid is squared and subjected to the same point-nonlinearity T such that:

$$P_{kn}(x,t) = T[e^2_{kn}(x,t)] \tag{40}$$

where the sigmoid non-linearity T is expressed as:

$$T(y) = y^{1.8}/(0.315 y^{1.64} + 6.8) \tag{41}$$

where $y = e_{kn\theta}(x,t)$. The sigmoid non-linearity is applied to reproduce the dipper shape of contrast discrimination functions as disclosed by J. Nachmias and R. V. Sansbury in "Grating Contrast: Discrimination May Be Better Than Detection", *Vision Res.* 14 (1974) 1039–1042. Thus, the transducer output is a compressed, normalized contrast pyramid for each image in the sequence.

Next, the spatially oriented filters 350 described above have the property that, for a single filter at a single spatial position given a sine grating to which it is optimally tuned, the output as a function of number of cycles in a patch will asymptote at little more than one cycle. In contrast, foveal human sensitivity continues to improve as the number of cycles in the patch continues to increase to around 5 as disclosed by J. Hoekstra et al. in "The Influence Of The Number Of Cycles Upon The Visual Contrast Detection Threshold For Spatial Sinewave Patterns", Vision Research 14 (1974) 365–368.

To account for this effect, the visual discrimination measure 112 may include an optional pooling section (pooler) 375. For foveal inputs, the pooling section receives and averages the transducer outputs over a small "neighborhood" by convolving with a squared-shaped kernel of foveal ($d_o$) of 5 to produce a pooled output. Namely, the small neighborhood is defined as a 5-by-5 kernel (5-by-5 photoreceptor space, i.e., retinal pixels) around each point on the transducer outputs.

For stimulus eccentricities outside the fovea, the diameter $d_p$ of this kernel increases as a linear function of eccentricity, according to the expression:

$$d_p = d_0 \left(1 + \frac{e}{k_p}\right) \tag{42}$$

where $d_o$ is the foveal diameter (5.0), e is the eccentricity in degrees (default to zero degrees) and $k_p$ is a scaling factor. This eccentricity dependent increase in pooling is needed to simulate an eccentricity dependent loss in performance, beyond that attributable to a loss in contrast sensitivity, on tasks requiring accurate relative localization of stimulus features, such as character discrimination.

After the pooling operation, each spatial position of each image is equivalent to an m-dimensional vector, where m is the number of pyramid levels times the number of orientations. These vectors are received by the distance section (distancer) 380, where the distance between these vectors for the two input images is calculated.

More specifically, the compressed, normalized contrast pyramids for two input images (e.g., a test image from input image sequence A and a reference image from input image sequence B) are subtracted in absolute value, and then averaged (root-mean-Q-powered) over the seven pyramid levels including the temporal channels to produce a distance measure (image metric) 250. Namely, the smaller pyramid levels are upsampled to the full 512×512 size, where the result is a set of m arrays $P_i(x)$ (where i indexes from 1 to m) for each input image x. From these, a distance measure $D(x_1, x_2, t)$ is calculated as follows:

$$D(x_1, x_2, t) = \left\{ \sum_{k,n} |P_{kn}(x_1, t) - P_{kn}(x_2, t)|^Q \right\}^{\frac{1}{Q}} \tag{43}$$

where $x_1$ and $x_2$ are the two input images (e.g., a test image and a reference image) and Q (known as the Minkowski exponent) is a parameter set at 2. (For Q=2, this expression corresponds to the Euclidean distance between the two vectors).

The output of the distance section 380 serves as an image metric 250. More specifically, the output is a spatial array of distance values or "JND" values, which can then be used to create a "JND map" for a pair of corresponding input images, i.e., one from input sequence A and one from input sequence B.

Figure 10:
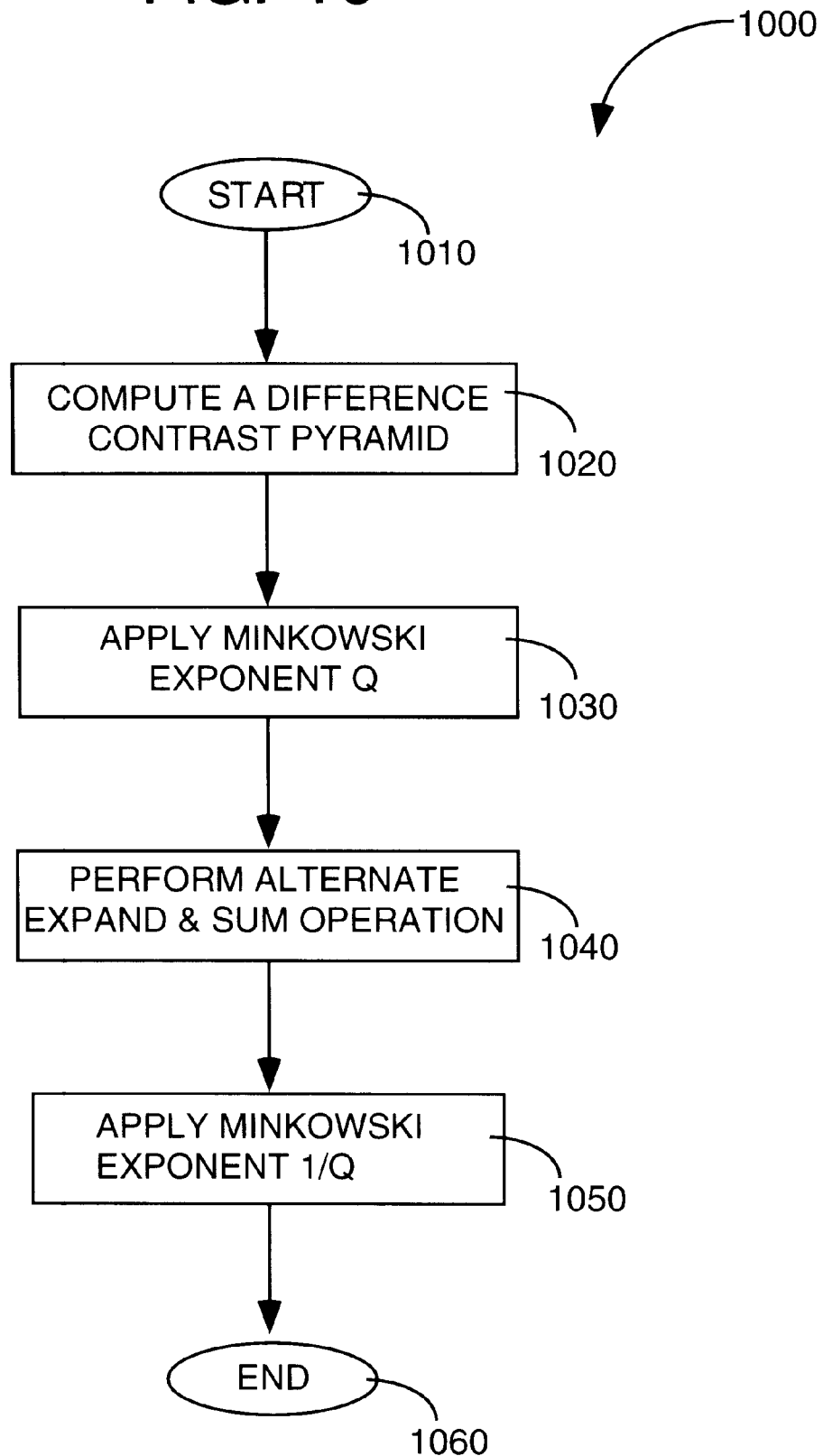
FIG. 10 illustrates a flowchart of a method for generating an image metric.

FIG. 10 illustrates a method 1000 for constructing a JND map from the contrast pyramids. Namely, the JND map $D(x_1, x_2, t)$ is computed from the compressed, normalized pyramids $P_{kn}(x,t)$ according to an implementation of equation (43). Method 1000 starts in step 1010 and proceeds to step 1020 where the pyramid P for frame t of one input image sequence is subtracted from that of another input image sequence at frame t.

In step 1030, the inner Minkowski exponent Q is applied to each value in the resulting pyramid. In step 1040, the Expand operation, as discussed above, is alternated with addition in a cascade from the coarsest pyramid level to the finest pyramid level. For example, the Expand operation is applied to the coarsest level (n=7), where the result is added to the next level of the pyramid (n=6). In turn, the Expand operation is performed again, where the result is added to the next level of the pyramid (n=5), and so forth until the finest level (n=1) is reached.

In step 1050, the resulting full-resolution image is subjected to the Minkowski exponent 1/Q to generate the JND map. Method 1010 ends in step 1060.

Method 1010 for generating JND map shares some similarities with that of method 700 for generating contrast pyramids. For example, the quantities $\sigma_k$ are not explicitly defined, but emerge from the recursive operation of the Reduce operation. The original image (the first, n=1, Gaussian pyramid level) undergoes convolution with the kernel (1,4,6,4,1)/16 to produce the second-level pyramid. Implicitly, the pixel spacing (i.e., visual-receptor spacing) is the basis for all the values $\sigma_k$. In particular, the standard deviation of the distribution (1,4,6,4,1)/16 is 1, where $\sigma_1$ is 1 inter-receptor distance. Each higher level convolutions with the kernel (1,4,6,4,1)/16 doubles the width of the Gaussian function. Thus, $\sigma_k = 2^{k-1} \sigma_1$ of equation (24) is an approximation.

However, an improvement on this approximation is obtained by noting that the variance of each successive kernel is the sum of the variance of the current "Gaussian" (e.g., $2^{k-1}\sigma_1$) with the variances of all the lower-level "Gaussians." Hence $$\sigma_k^2 = \sum_{j=1}^{k} 2^{2(j-1)} \sigma_1^2 \tag{44}$$

and therefore $$\sigma_k = [(4/3)(1-2^{-2k})]^{0.5} \, 2^{k-1} \, \sigma_1. \tag{45}$$

Equation (45) is important in the analytic evaluations that were employed to calibrate the Visual Discrimination Measure on simple sinewave inputs. In calibrating the Visual Discrimination Measure through certain adjustable parameters, such an analytic solution reduces the computation time that is needed to arrive at the optimal parameter values, as discussed below.

In turn, a plurality of other image metrics can be generated based on statistics computed from the JND maps. Generally, the values across the JND map can be combined according to a similar distance metric as described above. In practice, one of two different combinations is employed, e.g., the average across the map or the maximum, i.e., a simple maximum over all values of x and t:

$$\text{JND metric} = \max_{x,t} D(x_1, x_2, t) \qquad (46)$$

For threshold discrimination tasks, the latter is the more useful statistic, while for image quality rating tasks, the former is the more useful statistic.

Thus, the JND value output can be converted to a probability value. The actual probability values on the JND maps are calibrated in terms called JNDs, where 1 JND corresponds to a 75% probability that an observer viewing the two input images multiple times would be able to see the difference. JNDs above 1 are then calculated incrementally.

Although the visual discrimination measure 112 utilizes the spatial discrimination section 240 in the preferred embodiment, the present invention is not limited to this specific implementation. Other spatial discrimination devices or methods can be incorporated into the present invention to achieve similar results.

To illustrate, the complexity of the spatial discrimination section 240 can be reduced by removing the spatially oriented filters 350. In fact, one or more of the processing sections 355–380 of the spatial discrimination section 240 can be omitted depending on a particular application. A more dramatic simplification replaces a substantial portion of the spatial discrimination section with a simple mean squared error calculation. For some applications, the simplifications would produce little noticeable decrement in accuracy, but the system may benefit from a significant improvement in computational speed. Similarly, the various transformations performed by the retinal sampling section 330 (or the entire retinal sampling section 330) can also be omitted or modified to minimize the complexity of the visual discrimination measure 112.

Furthermore, although the present invention describes a plurality of temporal filters, contrast pyramid transforms, and oriented filters, those skilled in the art will realize that the visual discrimination measure can be simplified by reducing the number of filters. To illustrate, multiplexers can be used to share the temporal filters 334–335, the contrast pyramid transforms 340–345 and the oriented filters 350.

Furthermore, the visual discrimination measure 112 is able to generate many accurate predictions without any readjustment of its parameters. To achieve this robustness, calibration of the visual discrimination measure is performed in accordance with the calibration procedure discussed below.

The visual discrimination measure is calibrated using the visual contrast-sensitivity data reported by Koenderink and van Doorn (1979) obtained at a single mean-luminance level, and the data reported by van Nes, et al. (1967) at several mean-luminance levels. The stimulus is a dc-biased spatio-temporal sinusoid that is windowed by a square window with a width of four degrees of visual angle. This stimulus allows the visual discrimination measure to be replaced (for purposes of calibration) by a "Simple Model" in which many of the space-time integrals are performed analytically. Using the Simple Model, values are obtained for several free parameters.

The first step in the calibration determines the values for the impulse-response parameters a and b, and also the weights $\Gamma_{kn}(200)$, which are used to normalize the transient contrast pyramids. The model fits are made with the 200-troland spatio-temporal contrast-detection surface presented by Koenderink and van Doorn (1979). This experiment applies a frame rate of 61 Hz and a spatial sine wave contained in a window subtending 4° of visual angle. The objective is to adjust the undetermined parameters so as to optimize the fit to 1 of the quantities JND($\alpha,\omega$), where the function JND is described in equation (46), $\alpha=2\pi f_s$, $\omega=2\pi f_t$, and $f_s$ and $f_t$ are the spatial and temporal frequencies of the experimental sinusoid (respectively in cycles per degree and in Hertz). The following objective function is minimized in this calibration:

$$\sum_{\alpha,\omega} [1 - JND(\alpha, \omega)]^2. \qquad (47)$$

Implicit inputs to this calculation are the experimental contrast-threshold values $M(\alpha,\omega)$, which are substituted into the input image sequence $S(x_s,t)$. The initial image sequence is characterized by the spatio-temporal luminance distribution $S(x_s, t)$, where $x_s$ represents the two-dimensional spatial coordinates of the display, and t is the elapsed time.

In the course of the parameter fitting, the Minkowski exponent Q is found to give satisfactory fits when set equal to 2. The image size is 4° (degree) of visual angle, and the viewing distance is set at two meters so that the pixel density is commensurate with the inter-receptor spacing on the retina. The result is an image size of 584×584 pixels. To ensure adequate temporal sampling of a given sinusoidal stimulus (of frequency $f_o$), the inter-frame interval is taken to be $\Delta t=1/(f_o N_f)$, where $N_f$ is the number of frames per cycle of the sine wave, set equal to an integer as low as 2 and as high as 50 depending on temporal frequency. Since the input waveform is a cosine wave of known phase, the samples could be sampled at the extrema of the cosine. Hence, there is no need to sample at a higher frequency than the Nyquist rate. Constraining $\Delta t$ to be at least 0.065 seconds ensures that the low-frequency sine waves excited only low-frequency visual channels. Thus, for larger $\Delta t$, frame-transition discontinuities would have (artifactually) stimulated temporal channels that are tuned to the frame rate and not to $f_o$. The length of the convolution with $h_1$ is set equal to $(1/a)\ln(1000)$ to ensure a proper covering of the support of $h_1$ and the length of the convolution with $h_2$ is set equal to 15/b. (Here, a and b have units of Hz.)

The following parameter values are obtained by the calibration process: for k=1,7 (pyramid level), n=1,2 (sustained vs. transient temporal channel), a=5.200 Hz, b=84.14 Hz; $\Gamma_{kn}(200)$ are as in Table 1 above.

Furthermore, Table 2 and Table 3 illustrate $\Gamma_{kn}(200)$, as compared with other gamma values $\Gamma_{kn}(B)$ which are calculated at different troland spatio-temporal contrast-detection surfaces, i.e., $\Gamma_{kn}(0.085)$, $\Gamma_{kn}(0.85)$, $\Gamma_{kn}(8.5)$, $\Gamma_{kn}(85)$, $\Gamma_{kn}(850)$ and $\Gamma_{kn}(8500)$. Table 2 and Table 3 contain gamma values for the sustained (n=1) and transient channels (n=2) respectively.

TABLE 2

| | B = .085 | B = .85 | B = 8.5 | B = 85 | B = 200 | B = 850 | B = 8500 |
|---|---|---|---|---|---|---|---|
| $\Gamma_{11}$ | −0.9510 | 1.2594 | 0.0712 | 4.0194 | 12.7308 | 13.1787 | 14.2834 |
| $\Gamma_{21}$ | 1.1022 | −2.8079 | 42.6746 | 3.2149 | 3.2043 | 3.1973 | 3.1973 |
| $\Gamma_{31}$ | 333.302 | 22.1534 | 264.451 | 474.978 | 363.499 | 419.735 | 392.965 |
| $\Gamma_{41}$ | 383.868 | 287.615 | 447.552 | 428.487 | 396.256 | 444.187 | 423.818 |
| $\Gamma_{51}$ | 217.044 | 52.9620 | 366.628 | 102.093 | 222.712 | 374.071 | 257.335 |
| $\Gamma_{61}$ | 4.5727 | 4.5723 | 4.5727 | 4.5727 | 4.5727 | 4.5727 | 4.5727 |
| $\Gamma_{71}$ | 5.5727 | 5.5731 | 5.5728 | 5.5733 | 5.4674 | 5.5728 | 5.5728 |

TABLE 3

| | B = .085 | B = .85 | B = 8.5 | B = 85 | B = 200 | B = 850 | B = 8500 |
|---|---|---|---|---|---|---|---|
| $\Gamma_{12}$ | 2.0223 | 2.0223 | 2.0223 | 2.0223 | 2.0211 | 2.0223 | 2.0223 |
| $\Gamma_{22}$ | 57.3580 | 8.4974 | 24.5280 | 57.3145 | 58.2738 | 57.3617 | 57.3580 |
| $\Gamma_{32}$ | 202.575 | 27.4326 | 91.7265 | 248.273 | 205.836 | 204.898 | 202.575 |
| $\Gamma_{42}$ | 324.387 | 202.901 | 320.600 | 324.191 | 319.744 | 324.387 | 324.387 |
| $\Gamma_{52}$ | 483.090 | 12.6481 | 52.8371 | 105.451 | 470.162 | 483.447 | 483.090 |
| $\Gamma_{62}$ | 608.391 | 46.9130 | 41.4219 | 101.472 | 615.847 | 742.268 | 608.391 |
| $\Gamma_{72}$ | 552.851 | 27.0060 | 58.7099 | 197.382 | 294.924 | 253.210 | 255.349 |

The second calibration step determines the values of $\Gamma_{kn}(B)$ at various illuminances B, using the data of van Nes, et al. (1967). The same image size (4°), viewing distance (2 m), temporal integration limits, and time partition $\Delta t$ are chosen as in the first calibration step above. For each illuminance B, the quantity is optimized by:

$$\sum_{\alpha,\omega}[1 - JND(\alpha, \omega, B)]^2. \tag{48}$$

where the JND values are found through equation (46) using the experimental inputs $\alpha,\omega,B$ and the dependent experimental variables $m(\alpha,\omega,B)$. Parameters $\Gamma_{kn}(B)$ are identical to the values listed above for B=200.

The calibration of the visual discrimination measure 112 is based on a simplified stimulus consisting of a windowed spatio-temporal sinusoid on a uniform background. Such simplification enables several of the VDM convolution integrals to be performed analytically, thereby resulting in a considerable saving of computation time during the optimizations needed for calibration and parameter adjustment.

Using a Simple Model, the spatial window is ignored, so the input waveform is given by:

$$I(x,t) = B[1 + M(\alpha,\omega,B)\cos\alpha x \cos\omega t], \tag{49}$$

where $M(\alpha,\omega,B)$ are experimentally obtained modulation thresholds, B is the average retinal illuminance (in trolands), $\alpha=2\pi f_s$, $\omega=2\pi f_t$, and $f_s$ and $f_t$ are the spatial and temporal frequencies of the experimental sinusoid (respectively in cycles per degree and in Hertz).

Given this form for the assumed stimulus, the Simple Model has two realizations, one for the isoluminant calibration and the other for a more generic calibration. These realizations are described separately below.

Using equation (49), the time convolution integrals in equation (8) can be performed analytically, but a better correspondence with the real model is obtained by a discrete convolution of the waveform with the impulse-response time series obtained from equations (19a)–(19b). For channel n (n=1 for sustained, n=2 for transient), the time series (with $\Delta t_1 = \Delta t$ and time index m) is:

$$H^{(1)}_m = a \exp(-m\, a\, \Delta t), \tag{50}$$

and $$H^{(2)}_m = b[(m\, b\, \Delta t)^3/3! - (m\, b\, \Delta t)^5/5!]\exp(-m\, b\, \Delta t). \tag{51}$$

The time increment $\Delta t$ is defined so as to correspond as closely as possible with the frame rate (61 Hz), but to have an integer number of frames per cycle. Hence:

$$\Delta t = 1/(f_t N_f), \tag{52}$$

where $N_f=2$ (for $f_t>30$ Hz), 8 (for $f_t$ between 7 and 30 Hz), 32 (for $f_t$ between 1 and 7 Hz), and 50 otherwise. The term $\Delta t$ is constrained to at least 0.065 seconds.

Next, the discrete temporal impulse-response functions are numerically convolved with $\cos(m\, \omega\Delta t)$ to produce filtered time-waveforms $J_m^{(1)}, J_m^{(2)}$. From the periodicity of the cosine wave, only one cosine-period ($m<2\pi/\omega\Delta t$) of $J_m^{(1)}, J_m^{(2)}$ needs to be computed. Namely, applying equation (21) and a discrete form of Eq. (8):

$$J'_n(x, m) = \sum_{k=0}^{N(n)} B[1 + M(\alpha, \omega, B)\cos(\alpha x)\cos\{\omega(m-k)\Delta t\}]H_k^{(n)}\Delta t \tag{53}$$

$$= \left[B\Delta t \sum_{k=0}^{N(n)} H_k^{(n)}\right] + B\Delta t M(\alpha, \omega, B)\cos(\alpha x)J_m^{(n)}.$$

The first term in equation (53) is constant in space, so the Laplacian pyramid will remove this term, leaving the quantity $B\,\Delta t M(\alpha,\omega,B)\cos(\alpha x)J_m^{(n)}$ as the only effective term in $J'_n(x,m)$.

Next, the spatial convolution of $\cos(\alpha x)$ with the Gaussians $G_k(x)$ in equation (23) results in the expression:

$$\cos(\alpha x) * G_k(x) = \cos(\alpha x)\exp(-0.5\alpha^2\sigma_k^2), \tag{54}$$

where $\sigma_k = [(4/3)(1-2^{31\,2k})]^{0.5} 2^{k-1}\sigma_1$ (as in equation (45)).

Another simplification exploits the observation that the denominator in the contrast pyramid is approximately equal to B because the modulations M are small. Applying this simplification, the factor of B in equation (53) is canceled, and the maximum over x incurred by equation (46) can be done implicitly by setting $\cos(\alpha x)=1$ in equation (54). This leads to the following simplified expression for the normalized contrast pyramid of equation (38) (with spatial variable x now removed):

$$e_{kn}(m\Delta t) = \Gamma_{kn}(B)M(\alpha,\omega,B)J_m^{(n)}[\exp(-0.5\alpha^2\sigma_k^2) - \exp(-0.5\alpha^2\sigma_{k+1}^2)] \tag{55}$$

where B=200 trolands in the case of the isoluminant calibration. Recalling equation (25), in the case k=7, n=2, the alternative expression is:

$$e_{72}(m\,\Delta t) = \Gamma_{72}(B)M(\alpha,\omega,B)J_m^{(2)}[\exp(-0.5\alpha^2\sigma_7^2)]. \tag{56}$$

Next, each component of the normalized contrast pyramid is squared and subjected to the same point-nonlinearity T, as discussed above in equations (40) and (41)

Next, the computations in equations (43) and (46) are performed, subject to the simplifications that the P's for the reference image sequence are zero and the x dependence has already been removed:

$$JND = \max_t \left\{ \sum_{k,n} |P_{kn}(t)|^2 \right\}^{1/2}. \qquad (57)$$

Actually, this JND value is a function of the input stimulus, which is parameterized by $\alpha,\omega$: $JND=JND(\alpha,\omega)$.

Finally, the objective function (equation 47) to be optimized is formed. Consistency with the data is achieved, when the data values M are inserted in the above model and produces the result of one JND of perceived difference as predicted by the model. Calibration is accomplished when this consistency is achieved.

The generic calibration procedure (calibration on data of various luminances) is similar to the isoluminant calibration procedure with two differences. First, the step of obtaining the discrete temporal impulse-response function is omitted and $J_m^{(1)}$ is set equal to the value "1" and $J_m^{(2)}$ is set equal to the value "0". Second, the quantities $\Gamma_{kn}(B)$ are found separately for several values of B, but with a and b fixed as determined by the calibration at B=200 trolands.

Figure 11:
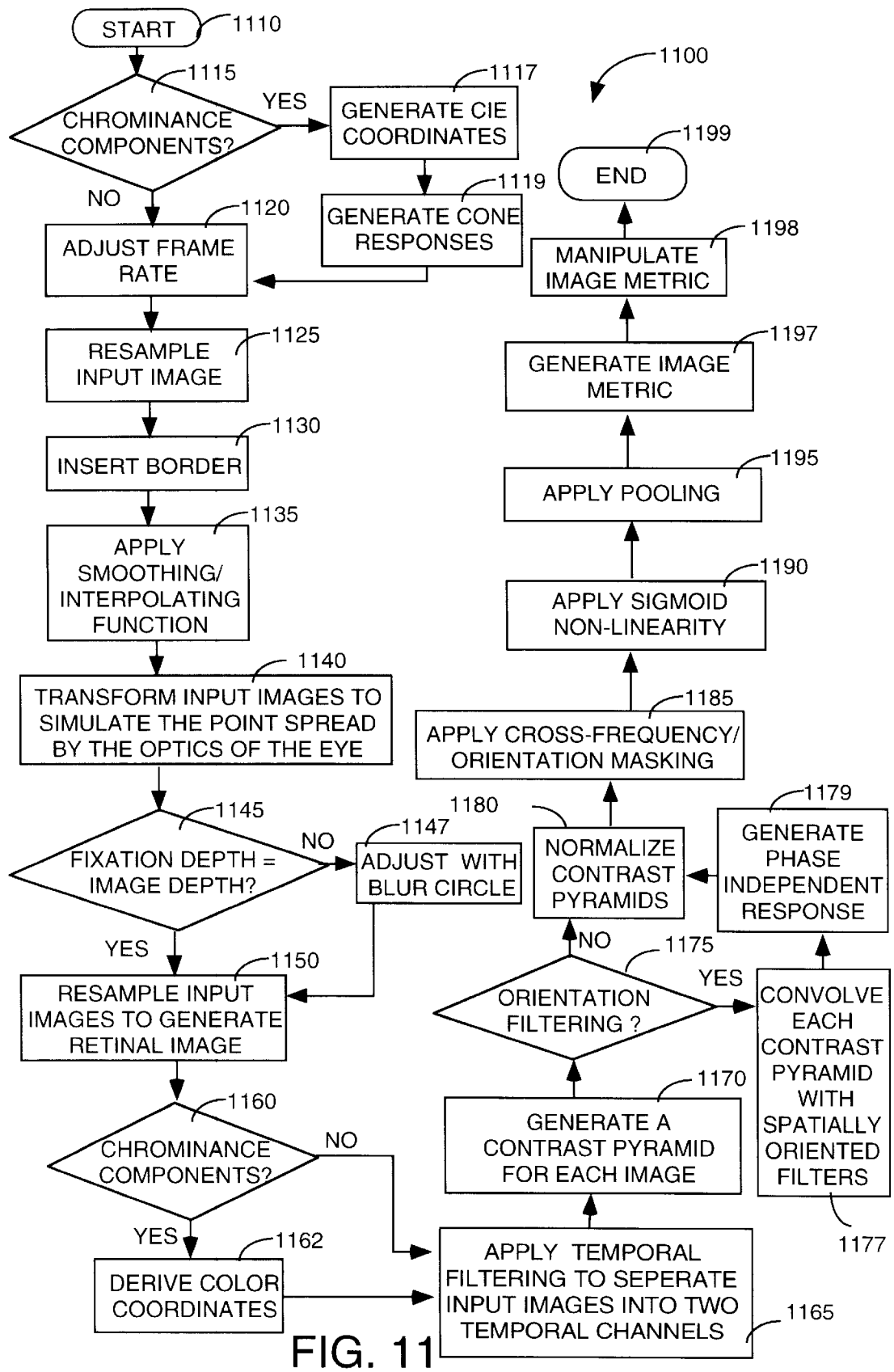
FIG. 11 illustrates a flowchart of a method for assessing the visibility of differences between two input image sequences.

FIG. 11 illustrates a method 1100 for assessing the visibility of differences between two input image sequences for improving image fidelity and visual task applications. Method 1100 begins at step 1110 and proceeds to step 1115 where the method determines whether the input image sequences contain chrominance components. If the query is affirmatively answered, then method 1100 proceeds to step 1117 where the RGB values for each pixel are combined with known emission spectra of the phosphors to produce CIE coordinates.

If the query is negatively answered, method 1100 proceeds to step 1120 where the input image sequence is "time-resampled" to account for the limitation of the human eye to process high frame rate image sequences. However, resampling does not take place unless the original (input image) frame rate is 200 Hz or higher. In addition, the answer to the query of step 1115 can be selectively determined to ignore the presence of any chrominance components for the purpose of reducing the computational overhead of a specific application.

In step 1119, the CIE coordinates of step 1117 are transformed into cone responses which are then used to arrive at another color coordinates in step 1162 as described below. Method 1100 then proceeds to step 1120.

In step 1125, the input images are resampled to correlate the inter-pixel spacing, size of the pixels and viewing distance of the input images with the inter-receptor spacing and size of the receptor of the retina respectively. Method 1100 computes an angular subtend for each pixel as seen from a viewer in accordance with equation (1).

In step 1130, method 1100 inserts a fixed-width border to each input image to prevent boundary effects. Two types of borders, fixed value border and edge value controlled border, can be applied depending on the application.

In step 1135, method 1100 adjusts (smooth/interpolate) the input image sequences to account for the pixels-to-receptors ratio. Namely, if the number of pixels is greater than the number of receptors, method 1100 applies "down-sampling" to the input images. If the number of receptors is greater than the number of pixels in the input image, method 1100 applies "up-sampling" to the input images. The smoothing/interpolating operation is performed in accordance with equations (2–5) as described above.

In step 1140, the input image sequences are transformed to approximate the point spread by the optics of the human eye. Method 1100 convolves the input images with the function of equation (6).

In step 1145, the method determines whether the fixation depth is equal to the image depth. If the query is affirmatively answered, then method 1100 proceeds to step 1150 where the input images are resampled to generate retinal images. If the query is negatively answered, method 1100 proceeds to step 1147 where a "blur circle" is calculated and convolved with the input images to account for changes in effective image resolution with changes in the difference between image depth and fixation depth.

In step 1150, method 1100 attempts to simulate the sampling process of the human eye. Effectively, each input image is sampled at a density of 120 pixels per degree of visual angle to generate a "retinal image" of 512×512 pixels for "foveal viewing". For "non-foveal viewing", step 1150 samples the input image at a density in accordance with equation (7).

In step 1160, the method 1100 again determines whether the input image sequences contain chrominance components. If the query is affirmatively answered, method 1100 proceeds to step 1162 where the cone responses from step 1119 are used to arrive at another three color coordinates in accordance with equations 28–29. If the query is negatively answered, method 1100 proceeds to step 1165. Again, the answer to the query of step 1160 can be selectively determined to ignore the presence of any chrominance components for the purpose of reducing the computational overhead of a specific application.

In step 1165, temporal filtering is applied to the retinal images to separate the luminance component of each input image into two temporal channels, a sustained channel and a transient channel. Optionally, the chrominance components of each input sequence of images are also separated into two different channels, thereby generating four temporal responses for each of the two input sequences. The functions of the two temporal filters are expressed in equations (9) and (10).

In step 1170, a contrast pyramid is generated by decomposing each image generated from step 1165 in accordance with equations (22–25) and FIG. 7 (and as modified for the chrominance component). Each contrast pyramid contains seven frequency channels or pyramid levels.

In step 1175, method 1100 determines whether orientation filtering is selected. If the query is negatively answered, method 1100 proceeds to step 1180. If the query is affirmatively answered, method 1100 proceeds to step 1177 where orientation filtering is applied.

In step 1177, spatially oriented filters are applied to each contrast pyramid where the output images are then transformed in step 1179 in accordance with equation (35) to simulate the conversion of linear response among simple cells to an energy response among complex cells in the mammalian visual cortex.

In step 1180, method 1100 normalizes each contrast pyramid with a set of weighing factors to account for the contrast sensitivity function of the human eye. The weighing factors are calculated by changing the value of the contrast normalization term $\Gamma_{kn}$ (in accordance with Tables 1–3) for each pyramid level and temporal channel.

In step 1185, method 1100 applies cross-frequency and/or cross-orientation masking of visual threshold to the contrast pyramids. Namely, each contrast pyramid value (input pyramid value) is divided or normalized by a sum of some other contrast pyramid values to account for the desensitization of the human visual perception under certain spatial and/or temporal frequency. The resulting contrast pyramid value (output pyramid value) is calculated in accordance with equation (39).

In step 1190, method 1100 applies a sigmoid non-linearity to each component of the normalized contrast pyramid in accordance with equations (40–41) to produce a transducer output. The transducer output represents a compressed, normalized contrast pyramid for each image in the input image sequence.

In step 1195, method 1100 applies a pooling operation to the transducer outputs from step 1190. The pooling operation averages the energy response over a small neighborhood by convolving with a disc-shaped kernel of a certain diameter size. For stimulus eccentricities inside of the fovea, the "foveal" diameter is set at 5. For stimulus eccentricities outside of the fovea, the diameter $d_p$ is calculated in accordance with equation (42). After the pooling operation, each spatial position of each image is equivalent to an m-dimensional vector.

In step 1197, the distance between these vectors for two corresponding input images is calculated. Smaller pyramid levels are upsampled to the full 512×512 size and the distance is calculated in accordance with equation (43) and FIG. 10 to produce a spatial array of distance values.

In step 1198, the spatial array of distance values can be used to generate various image metrics such as a probability prediction. Method 1100 then ends in step 1199.

There has thus been shown and described a novel method and apparatus for assessing the visibility of differences between two input image sequences for improving image fidelity and visual task applications. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. Apparatus for assessing visibility of differences between two input image sequences having a plurality of input images, where each of said input images contains a chrominance component, said apparatus comprising:
   a temporal filter for filtering the chrominance components of each of the input image sequences into a lowpass temporal response; and
   a spatial discriminator, coupled to said temporal filter, for generating an image metric from said lowpass temporal responses.

2. The apparatus of claim 1, wherein each of said input images further contains a luminance component, wherein said temporal filter filters said luminance components of each of the input image sequences into a second lowpass temporal response and a bandpass temporal response, wherein said spatial discriminator generates an image metric from said lowpass and bandpass temporal responses from both the luminance and chrominance components of the input image sequences.

3. The apparatus of claim 2, further comprises:
   a retinal sampler, coupled to said temporal filter, for sampling each of the input image sequences to produce a retinal sampled image sequence, where said input image sequence to said temporal filter is said retinal sampled image sequence.

4. The apparatus of claim 3, wherein said retinal sampler comprises:
   a frame adjuster for resampling each of the input image sequences to produce a frame adjusted image sequence;
   a first sampler, coupled to said frame adjuster, for resampling said frame adjusted image sequence to produce an angular subtended image sequence;
   a border inserter, coupled to said first sampler, for inserting a border around each image of said angular subtended image sequence;
   a second sampler, coupled to said border inserter, for resampling said bordered image sequence from said border inserter to produce a smoothed/interpolated image sequence; and
   a convolver, coupled to said second sampler, for approximating optics of a human eye to produce said retinal sampled image sequence.

5. The apparatus of claim 2, wherein said temporal filter comprises:
   a first temporal filter, coupled to said spatial discriminator, for filtering the chrominance components of the first input image sequence; and
   a second temporal filter, coupled to said spatial discriminator, for filtering the chrominance components of the second input image sequence.

6. The apparatus of claim 5, wherein said temporal filter further comprises:
   third and fourth temporal filters, coupled to said spatial discriminator, for filtering the luminance components of the first input image sequence; and
   fifth and sixth temporal filters, coupled to said spatial discriminator, for filtering the luminance components of the second input image sequence.

7. The apparatus of claim 6, wherein said temporal filters are expressed as:

$$J'_n(x, j) = \sum_{cj-N(n)}^{cj} I_D(x, k\Delta t) H^{(n)}(j\Delta t_1 - k\Delta t),$$

where $c = \Delta t_1/\Delta t$, $N(1) = (a\Delta t)^{-1}\ln(1000)$, $N(2) = 15(b\Delta t)^{-1}$ and $(n=1,2)$ where $n=1$ correlates said lowpass temporal response and where $n=2$ correlates said bandpass temporal response.

8. The apparatus of claim 2, wherein said spatial discriminator comprises:
   a contrast transform for computing a contrast pyramid having a plurality of levels for each image of said lowpass and bandpass temporal responses; and
   a gain control, coupled to said contrast transform, for applying cross masking of visual threshold to said contrast pyramids.

9. The apparatus of claim 8, wherein said spatial discriminator further comprises:
   a normalizer, coupled between said contrast transform and said gain control, for applying a weighing factor to each of said plurality of levels of said contrast pyramid to produce a normalized output;
   a transducer, coupled to said gain control, for applying a sigmoid non-linearity to said normalized output from said gain control to produce a transducer output; and
   a distancer, coupled to said transducer, for computing a distance between a plurality of m-dimensional vectors to produce said image metric, where each of said m-dimensional vectors represents a spatial position of each image of said transducer output.

10. The apparatus of claim 9, wherein said spatial discriminator further comprises:
    a spatially oriented filter, coupled between said contrast transform and said normalizer, for applying orientation tuning to each of said level of said contrast pyramid to produce a spatially oriented output; and a pooler, coupled between said transducer and said distancer, for averaging said transducer output over a kernel of pixels to produce a pooled output.

11. Apparatus for assessing visibility of differences between two input image sequences having a plurality of input images, said apparatus comprising:

a temporal filter for filtering each of the input image sequences into a lowpass temporal response and a bandpass temporal response; and a spatial discriminator, coupled to said temporal filter, for generating an image metric from said lowpass and bandpass temporal responses, where said spatial discriminator comprises a contrast transform for computing a contrast pyramid having a plurality of levels for each image of said lowpass and bandpass temporal responses and where said spatial discriminator further comprises a gain control, coupled to said contrast transform, for applying cross masking of visual threshold to said contrast pyramids.

12. The apparatus of claim 11, wherein each of said input images contains a chrominance component and wherein said lowpass temporal response includes a chrominance lowpass temporal response.

13. A method of assessing visibility of differences between two input image sequences having a plurality of input images, where each of said input image contains a chrominance component, said method comprising the steps of:

(a) filtering the chrominance components of each of the input image sequences into a lowpass temporal response; and (b) discriminating said lowpass temporal responses to generate an image metric.

14. The method of claim 13, further comprising the steps of:

(a') generating a set of color coordinates for each image pixel of said input image from said input image sequences, where said input image sequences to said filtering step (a) comprises said color coordinates.

15. The method of claim 14, wherein said generating step (a') comprises the steps of:

(a'1) generating CIE (Commission Internationale de l'Eclairage) coordinates for each image pixels of said input image from the input image sequences;

(a'2) transforming said CIE coordinates into cone responses; and (a'3) generating said set of color coordinates from said cone responses.

16. The method of claim 15, wherein said set of color coordinates of step (a'3) is expressed as:

$$yb=(S/Y)-(S/Y)_{D65}$$

and $$rg=(L/Y)-(L/Y)_{D65}.$$

17. The method of claim 15, wherein said set of color coordinates of step (a'3) is expressed as:

$$yb=S$$

and $$rg=(L-M).$$

18. The method of claim 13, where each of the input image further contains a luminance component, where said filtering step (a) further comprises the steps of:

(a1) filtering the luminance components of each of the input image sequences into a second lowpass temporal response and a bandpass temporal response.

19. The method of claim 18, wherein said discriminating step (b) comprises the steps of:

(b1) generating a contrast pyramid having a plurality of levels for each image of said lowpass and bandpass temporal responses; and (b2) applying cross masking of visual threshold to said contrast pyramids.

20. The method of claim 19, further comprising the step of:

(a") sampling each of the input image sequences to produce a retinal sampled image sequence, where said input image sequences to said filtering step (a) are said retinal sampled image sequences.

* * * * *